US 12,413,105 B2
Sep. 9, 2025

United States Patent
Cabrol et al.

(54) METHODS AND APPARATUS FOR LOAD-BASED ACCESS CONTROL IN RESONANCE MAGNETIC COUPLED NETWORKS

(71) Applicant: DRNC Holdings, Inc., Wilmington, DE (US)

(72) Inventors: Patrick Cabrol, Bayshore, NY (US); Tanbir Haque, Jackson Heights, NY (US); Hussain Elkotby, Conshohocken, PA (US); Ravikumar Pragada, Warrington, PA (US)

(73) Assignee: DRNC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/266,759

(22) PCT Filed: Dec. 9, 2021

(86) PCT No.: PCT/US2021/062614
§ 371 (c)(1),
(2) Date: Jun. 12, 2023

(87) PCT Pub. No.: WO2022/132561
PCT Pub. Date: Jun. 23, 2022

(65) Prior Publication Data
US 2024/0113566 A1  Apr. 4, 2024
US 2025/0183728 A9  Jun. 5, 2025

Related U.S. Application Data

(60) Provisional application No. 63/125,045, filed on Dec. 14, 2020, provisional application No. 63/146,981, filed on Feb. 8, 2021.

(51) Int. Cl.
*H02J 50/80* (2016.01)
*H02J 50/12* (2016.01)

(52) U.S. Cl.
CPC ............. *H02J 50/80* (2016.02); *H02J 50/12* (2016.02)

(58) Field of Classification Search
CPC .................. H02J 50/80; H02J 50/12
See application file for complete search history.

(56) References Cited

U.S. PATENT DOCUMENTS 8,810,072 B2 * 8/2014 Tsai ..................... H02J 50/80
307/104
8,855,786 B2 * 10/2014 Derbas .................... H01F 5/00
336/198

(Continued)

FOREIGN PATENT DOCUMENTS

WO  WO 2020131854 A1  6/2020
WO  WO 2021155101 A1  8/2021

OTHER PUBLICATIONS

Karalis et al., "Efficient Wireless Non-Radiative Mid-Range Energy Transfer", Annals of Physics, vol. 323, No. 1, Jan. 2008, 19 pages.

(Continued)

*Primary Examiner* — Rexford N Barnie
*Assistant Examiner* — Michael J Warmflash
(74) *Attorney, Agent, or Firm* — Volpe Koenig

(57) ABSTRACT

The disclosure pertains to methods and apparatus for operation by a wireless transmit/receive unit (WTRU). In one embodiment, a method includes receiving from a first device, a request to send a transmission to a second device via resonance magnetic coupling, the request including capability information indicating a set of load termination states supported by the first device; sending to the first device, measurement configuration information, the measurement configuration information including information indicating (1) timing and/or frequency information to schedule the measurement of a signal strength received by the first device; and (2) at least one load termination state of the set (Continued)

of load termination states to be used by the first device when performing measurements; receiving from the first device, measurement information resulting from measurements performed by the first device in accordance with the sent measurement configuration information; determining a load termination state for the first device based on the measurement information; and sending to the first device, information indicating the determined load termination state for the first device.

20 Claims, 26 Drawing Sheets

(56) References Cited

U.S. PATENT DOCUMENTS

| | | | | |
|---|---|---|---|---|
| 8,981,600 B2* | 3/2015 | Tsai | ............ | H02J 50/12 |
| | | | | 320/108 |
| 9,601,946 B2* | 3/2017 | Bae | ............ | H02J 50/12 |
| 2011/0221391 A1* | 9/2011 | Won | ............ | H02J 50/80 |
| | | | | 320/108 |
| 2011/0291489 A1* | 12/2011 | Tsai | ............ | H02J 50/402 |
| | | | | 307/104 |
| 2011/0299636 A1* | 12/2011 | Tsai | ............ | H02J 50/80 |
| | | | | 307/104 |
| 2012/0095531 A1* | 4/2012 | Derbas | ............ | H01Q 1/38 |
| | | | | 343/866 |
| 2012/0193998 A1* | 8/2012 | Tsai | ............ | H02J 50/70 |
| | | | | 307/104 |
| 2012/0235636 A1* | 9/2012 | Partovi | ............ | H02J 7/0042 |
| | | | | 320/108 |
| 2013/0154387 A1* | 6/2013 | Lee | ............ | H02J 50/12 |
| | | | | 307/104 |
| 2016/0056662 A1* | 2/2016 | Yoon | ............ | H02J 50/80 |
| | | | | 320/108 |
| 2016/0056664 A1* | 2/2016 | Partovi | ............ | B60L 53/122 |
| | | | | 307/104 |
| 2017/0149286 A1* | 5/2017 | Joye | ............ | H04B 5/79 |
| 2017/0237296 A1* | 8/2017 | Keith | ............ | H02J 50/40 |
| | | | | 307/104 |
| 2019/0097448 A1* | 3/2019 | Partovi | ............ | B60L 53/12 |
| 2019/0140491 A1* | 5/2019 | Tsai | ............ | H02J 50/80 |
| 2019/0296590 A1* | 9/2019 | Chae | ............ | H02J 7/02 |
| 2021/0028651 A1* | 1/2021 | Goodchild | ............ | H02J 50/90 |
| 2022/0038136 A1* | 2/2022 | Cabrol | ............ | H04B 5/266 |

OTHER PUBLICATIONS

Mongia et al., "RF and Microwave Coupled-Line Circuits: Second Edition", Artech House Publishers, Boston, Massachusetts, 2007, 618 pages.

Kurs et al., "Wireless Power Transfer via Strongly Coupled Magnetic Resonances", American Association for the Advancement of Science (AAAS), ScienceMag, vol. 317, No. 5834, Jul. 6, 2007, 4 pages.

Sample et al., "Analysis, Experimental Results, and Range Adaptation of Magnetically Coupled Resonators for Wireless Power Transfer", Institute of Electrical and Electronics Engineers (IEEE), IEEE Transactions on Industrial Electronics, vol. 58, Issue No. 2, Feb. 2011, 11 pages.

Choma et al., "Feedback Networks: Theory and Circuit Applications", World Scientific Publishing Company, Advanced Series in Circuits and Systems, vol. 5, Sections 3.3.0 to 3.3.5, 2007, pp. 238-254.

* cited by examiner

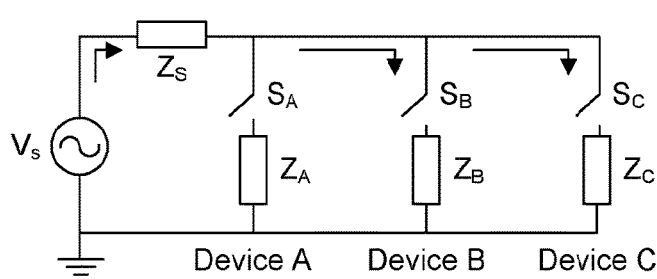 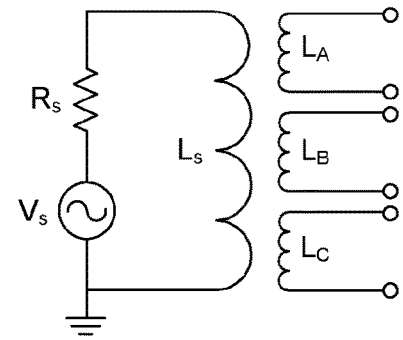
FIG. 8A                                          FIG. 8B
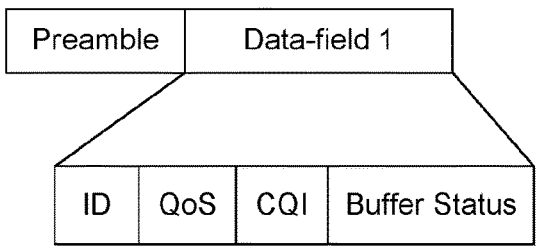 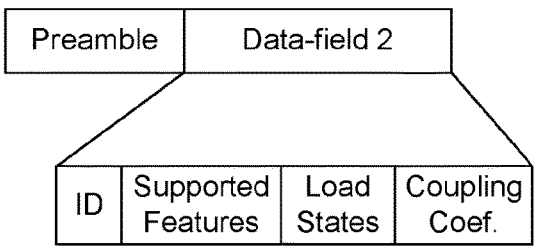
FIG. 9A                                          FIG. 9B
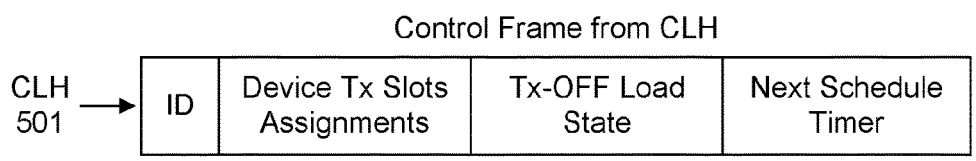
FIG. 10A
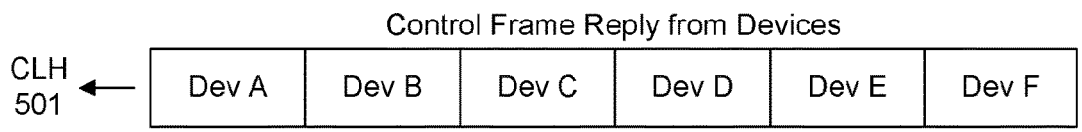
FIG. 10B

METHODS AND APPARATUS FOR LOAD-BASED ACCESS CONTROL IN RESONANCE MAGNETIC COUPLED NETWORKS

CROSS-REFERENCE TO RELATED APPLICATIONS

The application is a U.S. National Stage Application under 35 U.S.C. § 371 of International Patent Application No PCT/US2021/062614, filed Dec. 9, 2021, which claims the benefit of priority to U.S. Provisional Patent Application Ser. No. 63/125,045, filed Dec. 14, 2020, and U.S. Provisional Patent Application Ser. No. 63/146,981, filed Feb. 8, 2021, the contents of each of which is incorporated herein by reference.

FIELD

Embodiments disclosed herein generally relate to wireless communications and, for example to methods and apparatus for load-based access control to a Resonance Magnetic Coupled (RMC) network.

BACKGROUND

Wireless power transfer (WPT), as a result of the recent universal adoption of portable electronic devices, has attracted considerable attention in many commercial applications including smartphones, medical instruments, electric vehicles (EVs), wireless sensors, and other IoT devices.

Conventional radiative energy transfer, used mainly for transferring information, may pose some difficulties for power transfer applications. For instance, power transfer using omnidirectional radiation patterns may be inefficient, while unidirectional radiation, while more efficient in terms of energy transfer, may use (e.g., require) line of sight and special tracking mechanisms to accommodate mobility.

Previous works have demonstrated power delivery at mid-field with higher efficiency than far-field approaches, and at longer distances than traditional inductive coupled systems. Subsequent work managed to overcome the fixed distance and orientation limitations associated with the previously mentioned studies, where efficiency would fall-off rapidly when the receiving device is relocated away from its optimal operating coordinates.

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref.") in the Figures ("FIGS.") indicate like elements, and wherein:

FIGS. 8A and 8B are a loading model and a transformer representation of a plurality of load devices coupled to a single power source;

FIGS. 9A and 9B illustrate contents of a control plane frame in accordance with two exemplary embodiments;

FIGS. 10A and 10B illustrate content for a downlink control plane frame and an uplink control plane frame in accordance with one embodiment;

DETAILED DESCRIPTION

Introduction

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Example Networks for Implementation of the Invention

Figure 1A:
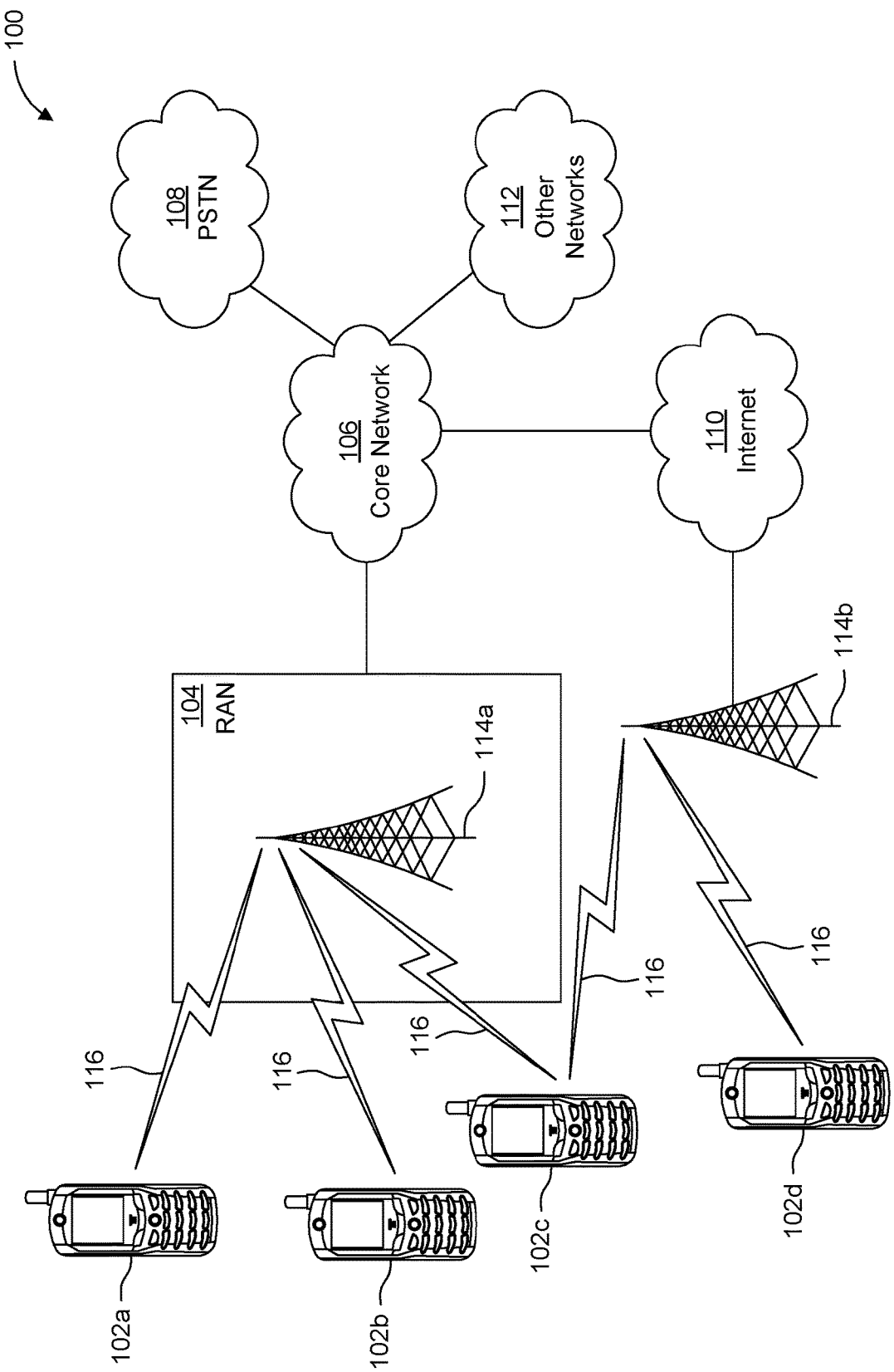
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (e.g., Wireless Fidelity (WiFi), IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
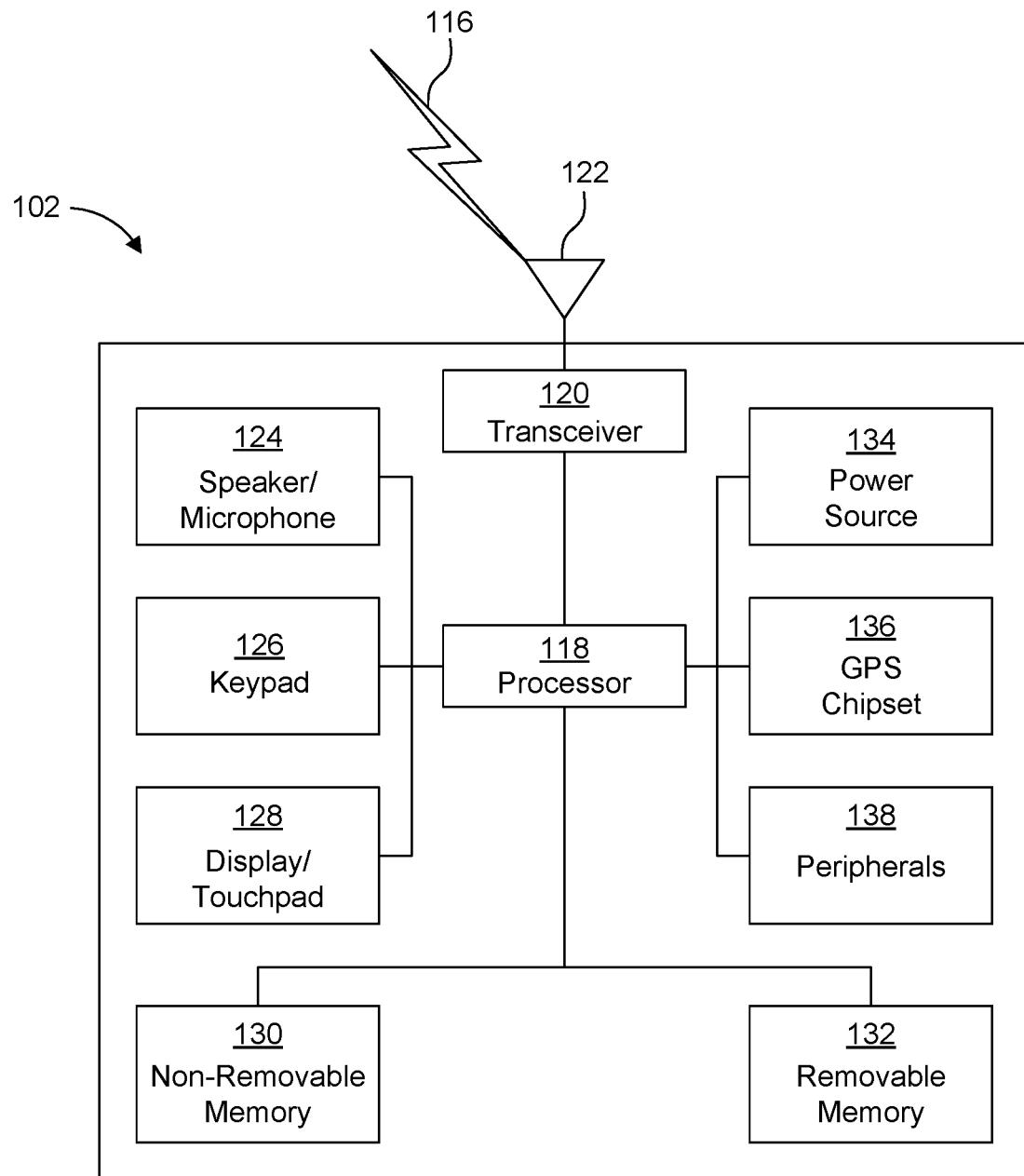
FIG. 1B is a system diagram illustrating an example wireless transmit/receive unit (WTRU) that may be used within the communications system illustrated in FIG. 1A according to one embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
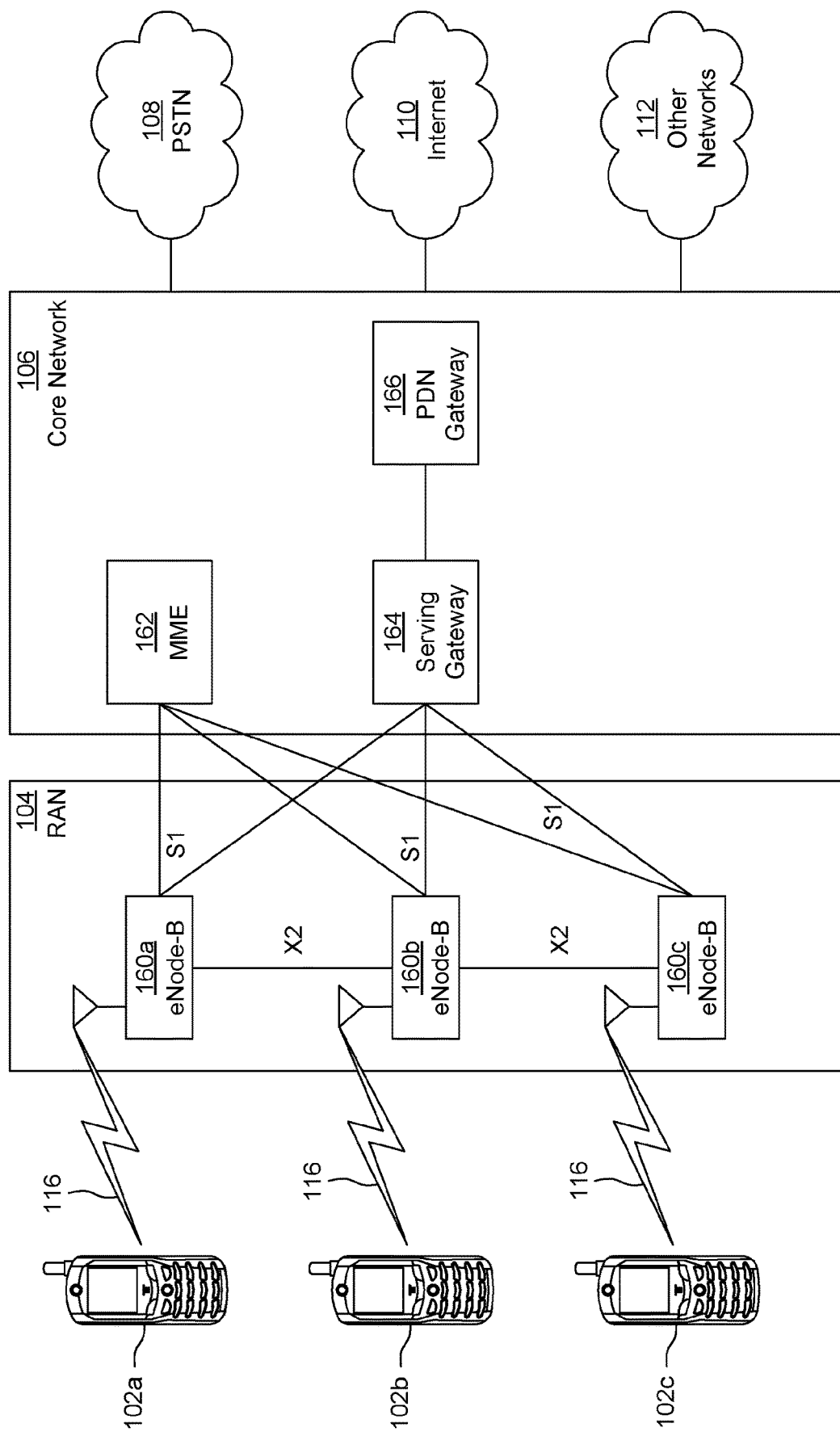
FIG. 1C is a system diagram illustrating an example radio access network (RAN) and an example core network (CN) that may be used within the communications system illustrated in FIG. 1A according to one embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
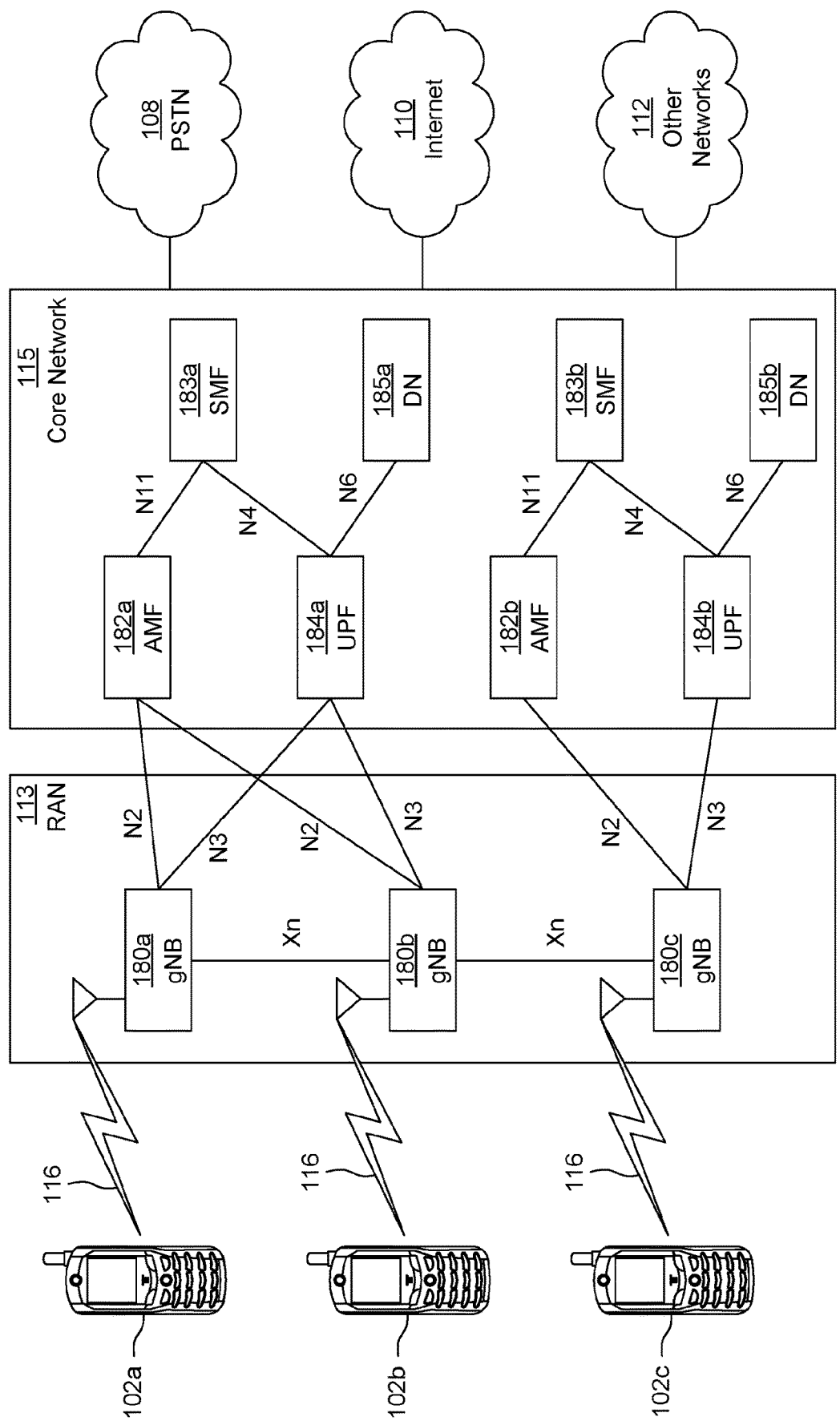
FIG. 1D is a system diagram illustrating a further example RAN and a further example CN that may be used within the communications system illustrated in FIG. 1A according to one embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Wireless Power Transfer

1. BACKGROUND

The feasibility of using resonant objects coupled through their nonradiative fields for mid-range energy transfer have been demonstrated. Intuitively, two resonant objects tuned at the same resonant frequency may tend to exchange energy efficiently. In addition, since most common materials do not interact with magnetic fields, magnetic resonance systems may be particularly suitable for everyday applications.

When multiple come within range of each other, they may (e.g., there arises a need to) coordinate their interaction and/or minimize cross-interference.

In LTE and other cellular systems, a Common Control Channel (CCCH) may be responsible for transferring control information between all mobile devices (e.g., WTRUs 102) and the Base Transceiver Station (BTS). This is (e.g., necessary) for the implementation of "call origination" and/or "call paging" functions.

A Physical Broadcast Channel (PBCH) may carry system information for UEs attempting to access the network. In Universal Mobile Telecommunication System (UMTS), the group of Broadcast Channels (BCHs) may include three channels, namely, Broadcast Control Channel (BCCH), Frequency Correction Channel (FCCH), and/or Synchronization Channel (SCH). A Cell Broadcast Channel (CBCH) may be used to transmit messages to be broadcast to all Mobile Stations (MSs) within a cell. A MS may (e.g., then) move to a dedicated channel in order to proceed with either call setup, response to a paging message, Location Area Update, or Short Message Service (SMS).

The Medium Access Control (MAC) layer may control the higher layers' access to the PHY layer. The MAC layer may be connected to the PHY layer below it through transport channels, and to the RLC layer above it through logical channels. The MAC layer may decide which logical channels can access the transport channels at a given time and performs multiplexing and/or de-multiplexing of the data between them. The MAC layer may basically provide the radio resource allocation service and/or the data transfer service to the upper layer.

1.1. Resonance Magnetic Coupled System Overview

Figure 2:
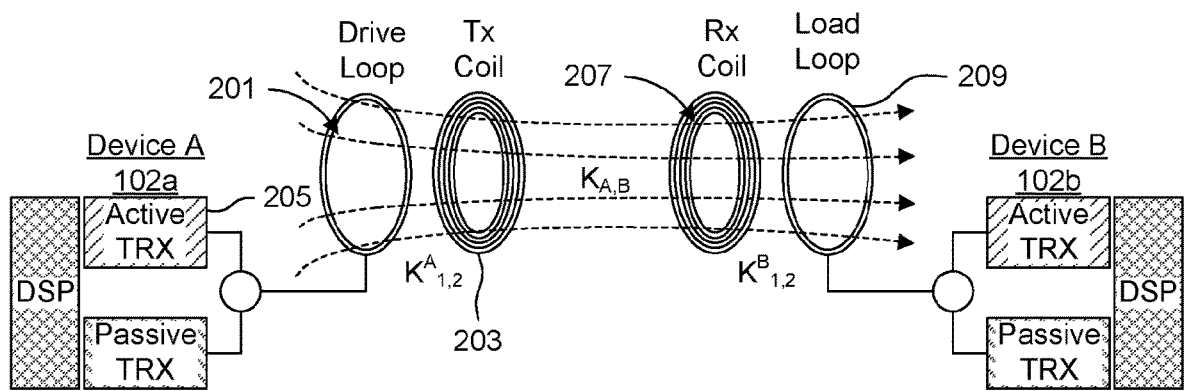
FIG. 2 is a diagram of a resonance magnetic wireless power transfer and communications system.
Figure 3:
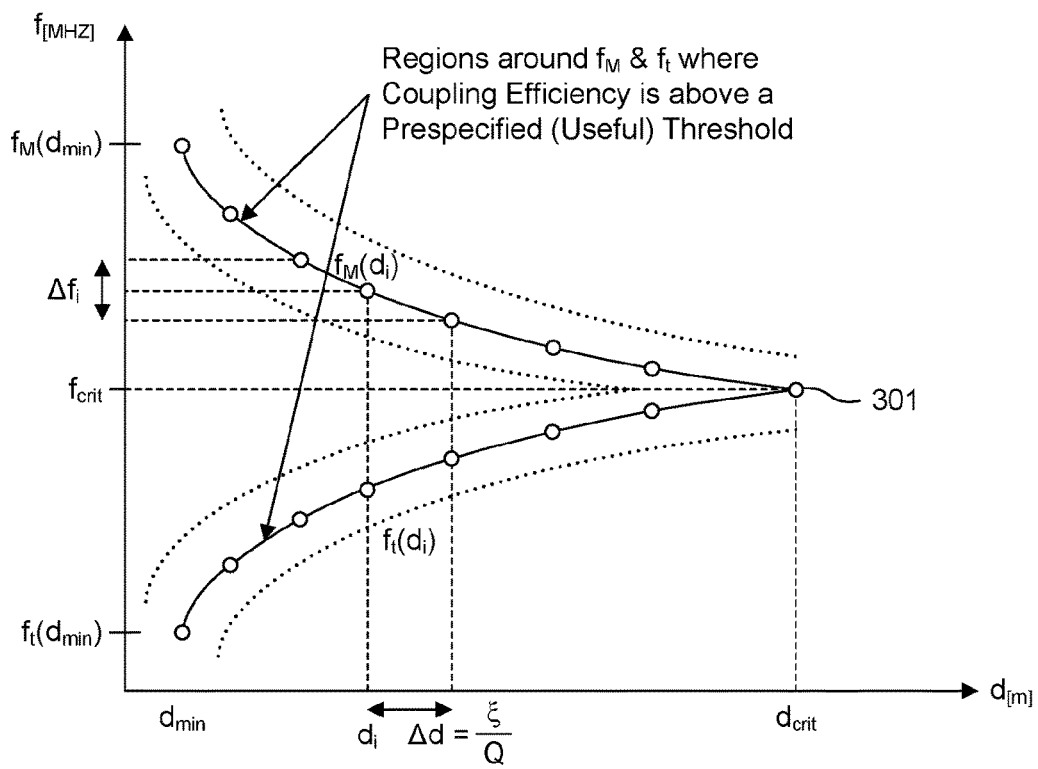
FIG. 3 is a graph of resonance magnetic frequency as a function of distance for a resonance magnetically coupled system.

A diagram of a resonance magnetic WPT and communications system is shown in FIG. 2. A single turn drive loop 201 coupled to a multi-turn spiral coil 203 make up the transmit antenna. In a case where the transmitter (TRX) amplifier 205 powers the drive loop 201, the resulting oscillating magnetic field may excite the Tx coil 203, which may store energy in the same manner as a discrete LC tank. The Rx coil 207 and/or the Load loop coil 209 on the receive side may function in a similar, complementary manner. The key interaction may occur between the Tx coil 203 and/or the Rx coil 207, any (e.g., each) of which may be a high-Q RLC (high-quality resistor, inductor, capacitor) tank resonator. In a case where (e.g., just as) the loop and coil (201 and 203 or 209 and 207) may be magnetically coupled, the transmit and receive coils (205 and 207) may share a mutual inductance which may be a function of the geometry of the coils and/or the distance between them. FIG. 3 is a graph illustrating a typical plot of resonance magnetic frequency as a function of distance for a resonance magnetically coupled system.

Equivalently, in a case where driving a wireless power system with a Radio Front end (RF) source and/or using a load resistor on the receiver to extract work from the system, the amount of coupling may define how much energy may be transferred per cycle. This means that there may be a distance (called the critical coupling point) beyond which the system may no longer drive a given load at maximum efficiency. An analytic model of the magnetically coupled resonator system is presented in the next section. This is followed by derivations of key system parameters and figures of merit. Finally, a description of adaptive tuning techniques used to achieve near constant efficiency vs. distance is presented.

1.1.1. Circuit Model and Transfer Function

Figure 4:
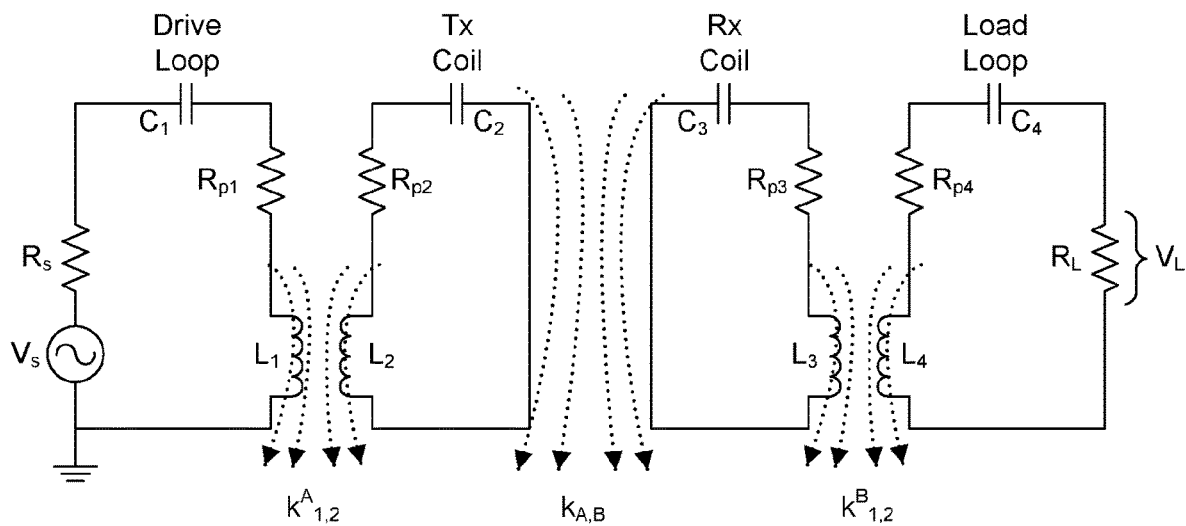
FIG. 4 is a diagram of a resonant magnetic power transfer circuit model.

FIG. 4 is a diagram of a resonant magnetic power transfer circuit model. The resonance magnetic system modeled in FIG. 4 may use lumped circuit elements to describe the resonance magnetic system. It shows four circuits magnetically coupled as represented by coefficients $k_{12}^A$, $k_{AB}$, $k_{12}^B$. The drive loop, on the left side, may be excited by a source with output impedance $R_s$, a single turn drive loop modeled as inductor $L_1$, with parasitic resistance $R_{p1}$. Capacitor, $C_1$, along with $L_1$, may set the drive loop resonance frequency.

The transmit coil may comprise (e.g., consist of) a multi-turn spiral inductor ($L_2$), with parasitic resistance ($R_{p2}$) and/or self-capacitance $C_2$. Inductors $L_1$ and $L_2$ may be linked with coupling coefficient $k_{12}^A$. The receiver side may share a similar topology.

The transmitter and receiver coils may be linked by coupling coefficient, $k_{AB}$. In a typical implementation of the system, $k_{AB}$ may vary, for example, as a function of the distances between the transmitter and receiver.

Electric circuit theory (ECT) may be one of the tools that allows the design and analysis of WPT systems. For the resonant magnetic circuit model shown in FIG. 4, the current in any (e.g., each) resonant circuit may be determined using Kirchhoff's voltage law (1-4):

$$I_1\left(R_S + R_{p1} + j\omega L_1 + \frac{1}{j\omega C_1}\right) + j\omega I_2 M_{12} = V_S \quad (1)$$

$$I_2\left(R_{p2} + j\omega L_2 + \frac{1}{j\omega C_2}\right) + j\omega(I_1 M_{12} - I_3 M_{23}) = 0 \quad (2)$$

$$I_3\left(R_{p3} + j\omega L_3 + \frac{1}{j\omega C_3}\right) + j\omega(I_4 M_{34} - I_2 M_{23}) = 0 \quad (3)$$

$$I_4\left(R_L + R_{p4} + j\omega L_4 + \frac{1}{j\omega C_4}\right) + j\omega I_3 M_{34} = 0 \quad (4)$$

The coupling coefficient may be defined as:

$$k_{xy} = \frac{M_{xy}}{\sqrt{L_x L_y}}, \quad 0 \le k_{xy} \le 1 \quad (5)$$

where M is mutual inductance (e.g., $M_{12}$ is the mutual inductance between coils 1 and 2); and $\omega$ is frequency.

After solving these four KVL equations for the voltage across the load resistor, we have:

$$\frac{V_L}{V_S} = \frac{j\omega^3 k_{12} k_{23} k_{34} L_2 L_4 \sqrt{L_1 L_4} R_l}{\left(k_{12}^2 k_{34}^2 L_1 L_2 L_3 \omega^4 + Z_1 Z_2 Z_3 Z_4 + \omega^2 \right. } \\ \left. (k_{12}^2 L_1 L_2 L_3 Z_4 + k_{23}^2 L_2 L_3 Z_1 Z_4 + k_{34}^2 L_3 L_4 Z_1 Z_2)\right)} \quad (6)$$

Using the following substitutions:

$$Z_1 = R_{p1} + R_s + j\omega L_1 - \frac{1}{j\omega C_1} \quad (7)$$

$$Z_2 = R_{p2} + j\omega L_2 - \frac{1}{j\omega C_2} \quad (8)$$

$$Z_3 = R_{p3} + j\omega L_3 - \frac{1}{j\omega C_3} \quad (9)$$

$$Z_4 = R_{p4} + R_L + j\omega L_4 - \frac{1}{j\omega C_4} \quad (10)$$

one can calculate the equivalent $S_{21}$ scattering parameter using [1], [2] which results in equation:

$$S_{21} = 2\frac{V_L}{V_S}\left(\frac{R_S}{R_L}\right)^{1/2} \quad (11)$$

1.1.2. Derivation of Critical Coupling and System Parameters

First, the equation of critical coupling may be derived by substituting the term for series quality factor and/or resonant frequency, shown in the equation below, into the transfer function.

$$Q_i = \frac{1}{R_i}\sqrt{\frac{L_i}{C_i}} = \frac{\omega_i L_i}{R_i} = \frac{1}{\omega_i R_i C_i} \quad (12)$$

$$\omega_i = \frac{1}{\sqrt{L_i C_i}} \quad (13)$$

The voltage gain at the center frequency $\omega_0$ is presented in the following equation:

$$\left(\frac{V_L}{V_S}\right)\bigg|_{\omega=\omega_0} = \frac{i k_{cc} k_{12}^2 Q_{coil}^2 Q_{loop}^2}{k_{cc}^2 Q_{coil}^2 + \left(1 + k_{12}^2 Q_{coil} Q_{loop}\right)^2} \quad (14)$$

where $k_{cc}$ is a notation representing the symmetric coil-to-coil coupling (e.g., $k_{AB}$ and $k_{BA}$). Solving for $k_{cc}$, notation for the symmetric coil-to-coil coupling ($k_{AB}$ and $k_{BA}$), yields:

$$k_{crit} = \frac{1}{Q_{coil}} + k_{12}^2 Q_{loop} \quad (15)$$

where $K_{crit}$ is the critical coupling coefficient, e.g., the point above which energy transfer is no longer practical ($K_{crit}$ is the coupling efficiency at point 301 in the frequency/distance plot of FIG. 3);

$Q_{coil}$ is the quality factor of the coil;

$Q_{loop}$ is the quality factor or the drive loop; and $K_{12}$ is the coupling factor (or coupling coefficient) between the loop and the coil.

At the critical coupling point:

$$|S_{21}|_{crit} = \frac{k_{12}^2 Q_{coil} Q_{loop}}{1 + k_{12}^2 Q_{coil} Q_{loop}} = \frac{k_{12}^2 Q_{loop}}{k_{crit}} \quad (16)$$

Reducing $k_{12}$, the loop-to-coil coupling, lowers $k_{crit}$ and (e.g., therefore) may increase range. However, according to equation (16), reducing $k_{12}$ may (e.g., also) reduce efficiency.

Radiative far-field communication systems may not be impacted by the number, location, and/or orientation of devices; but mid-field RMC channels, (e.g., in addition to their dependency on all the above) may be also dependent on the load termination at the devices.

As the number of devices (e.g., WTRUs 102) introduced within a given RMC range increases, the power coupled into the mid-field by a transmitter to any (e.g., each) of the devices (e.g., WTRUs 102) may decrease, e.g., the total power coupled into the mid-field by a transmitter may be divided amongst the receiving devices. The amount of energy coupled to a receiver may be proportional to its coupling factor and/or inversely proportional to the number of receiving devices (e.g., WTRUs 102) in range. Any remaining power, for example not absorbed by a load, may be reflected at the transmitting source.

Resonance magnetic coupling may facilitate mid-field WPT. Mobility may be supported within the mid-field range at the cost of adjusting the tank circuit's resonance frequency to compensate for changes in location and/or orientation of the magnetically coupled devices. As two devices (e.g., WTRUs 102) move relative to each other (including both rotation and translation), the coupling efficiency between them at a given frequency may change. As two devices (e.g., WTRUs 102) move relative to each other, the optimal frequency for maximum energy coupling between the two devices (e.g., WTRUs 102) may change.

New procedures have been developed to enable device discovery within the RMC framework and/or to establish device-to-device communication.

With the likely scenario of multiple device pairs communicating within the same RMC range, that may cause potential interference to adjacent device pairs, the access to the network from multiple devices (e.g., WTRUs 102) may be moderated, for example, while taking into account the number and/or proximity of those devices.

Herein are disclosed methods, apparatus, and procedures to leverage the loading effect to moderate access to RMC networks and/or to use non-transmitting devices (e.g., WTRUs 102) to improve information transfer over active RMC links.

2. RMC IN COMMUNICATION SYSTEMS

This section considers WTRUs leveraging loading effect of devices (e.g., WTRUs 102) coupled to a common or dedicated channel to moderate/manage and/or optimize access to RMC network resources. It also considers WTRUs acting as a cluster head and/or moderating/managing devices (e.g., WTRUs 102) inclusion and/or exclusion from a cluster to optimize links quality amongst cluster pairs over unicast and/or broadcast channels.

2.1. RMC NETWORK ACCESS CONTROL FOR INFORMATION TRANSFER

Figure 5:
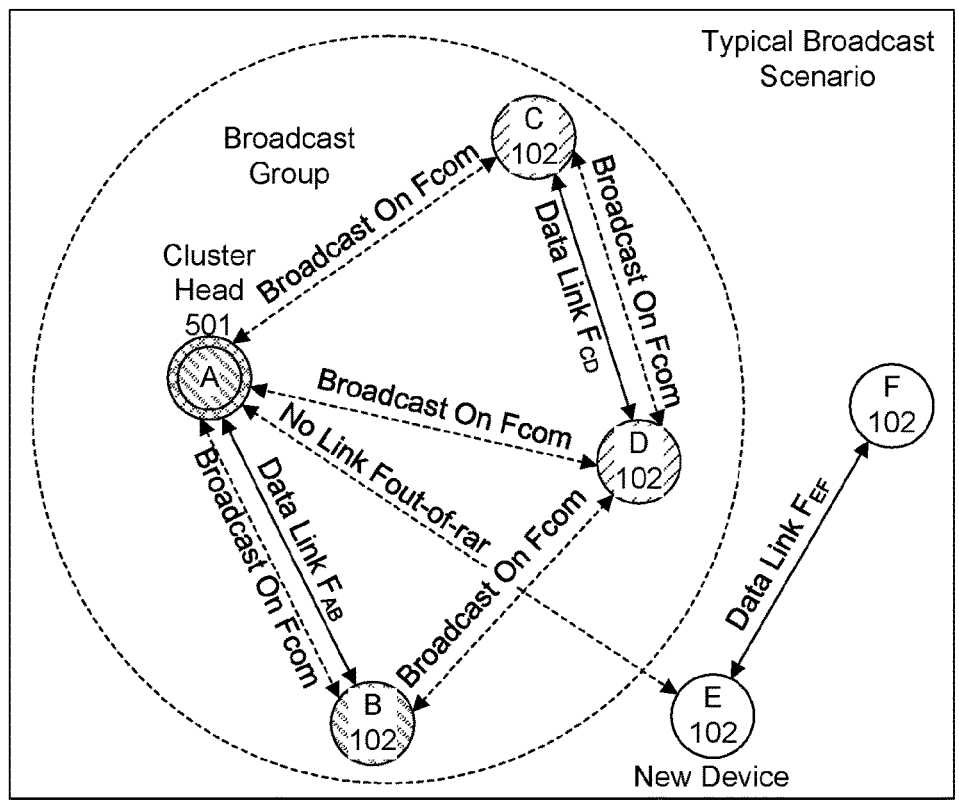
FIG. 5 is a diagram showing a resonance magnetic broadcast group.

FIG. 5 is a diagram illustrating a typical broadcast scenario for a cluster head A (e.g., WTRU 501) managing a number of devices (e.g., WTRUs 102) in a broadcast group. In this example, devices (e.g., WTRUs 102) C and D may have an RMC data link and cluster head A (e.g., WTRU 501) and device B may have a RMC data link. The cluster head A (e.g., WTRU 501) may broadcast control information to (e.g., all) the devices (e.g., WTRUs 102) under its control, e.g., B, C, and D. The individual devices (e.g., WTRUs 102) may exchange control information amongst themselves, such as illustrated between devices (e.g., WTRUs 102) B and D and/or between devices (e.g., WTRUs 102) C and D.

Devices E and F may have a RMC data link between them, but they are not within range of the cluster head A (e.g., WTRU 501), and/or thus may not be managed by cluster head A (e.g., WTRU 501). They may be managed by a different cluster head (e.g., WTRU 501) (not shown) or may operate autonomously of any cluster head (e.g., WTRU 501).

2.1.1. Centralized Versus Distributed Framework

Figure 6:
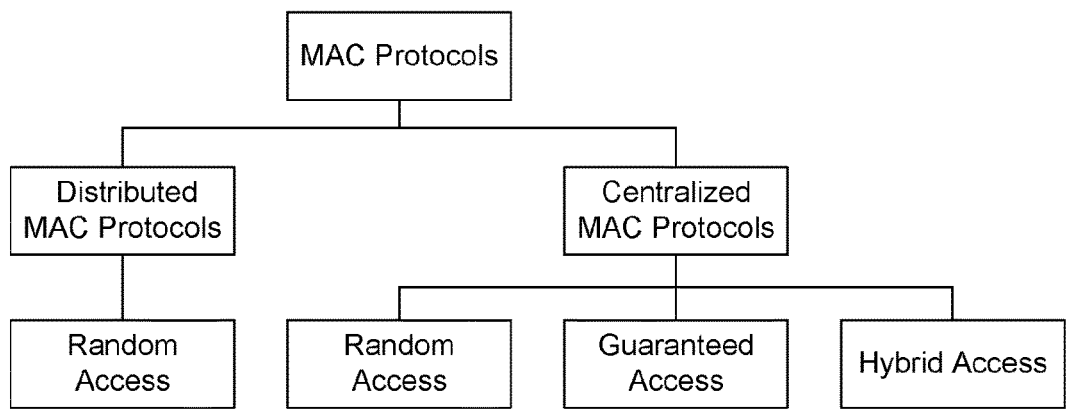
FIG. 6 is a diagram illustrating the two main frameworks for medium access in communication networks, namely, centralized medium access and distributed medium access.

As illustrated in FIG. 6, two main frameworks may be typically considered to moderate the medium access: a centralized framework and a distributed framework. In centralized wireless networks, such as infrastructure mode in WLANS and cellular networks, the Access Point (AP) or Base Station (BS) may consider broadcast transmission in the down link and/or may control the uplink access, for example, according to specific Quality of Service (QoS) targets. On the other hand, distributed wireless networks, such as packet radio or ad hoc networks (as in IEEE 802.11), may have no central controller and/or may utilize techniques such as ALOHA and/or Carrier Sense Multiple Access-Collision Avoidance/Collision Detection (CSMA-CA/CD) for medium access control.

In this disclosure, we consider a centralized framework where a cluster head (e.g., WTRU 501) may be responsible for coordinating access to RMC network resources.

A cluster may be formed when two or more devices (e.g., WTRUs 102) appear within RMC range of each other, for example, following a discovery procedure initiated by one or more of those devices. Further, in this centralized framework, a cluster head (e.g., WTRU 501) may be a device responsible for coordinating with other cluster members to establish a common channel that may be used for broadcast communication. The ability to communicate with other cluster members with a Signal to Noise Ratio (SNR) above a minimum threshold either simultaneously or consecutively in time, may be one of the main qualifications for this function.

2.1.2. Impact of Load Termination

In traditional wireline communication systems, data transmission between multiple device pairs may be conducted over a single wire/cable (the channel), using a combination of frequency division multiplexing (FDM) and/or time division multiplexing (TDM). Any (e.g., each) data link may be assigned a segment of the channel bandwidth for transmission. The receiving devices (e.g., WTRUs 102) may be tuned to their designated channel frequencies to terminate the communication link. Owing to frequency orthogonality and/or filtering, individual link performance may not be affected by other devices (e.g., WTRUs 102) operating in adjacent channels.

Similarly, in far-field communication systems, the received signal strength by a device (e.g., WTRU 102) may not be dependent on the power received by other devices (e.g., WTRUs 102) in the far field. It may be a function of the distance from the transmitting device (e.g., WTRU 102) and/or the channel characteristics, such as fading and/or frequency dependent attenuation.

In resonance magnetic mid-field communication systems, energy may be coupled from the data source to the receiving devices.

Figure 7A:
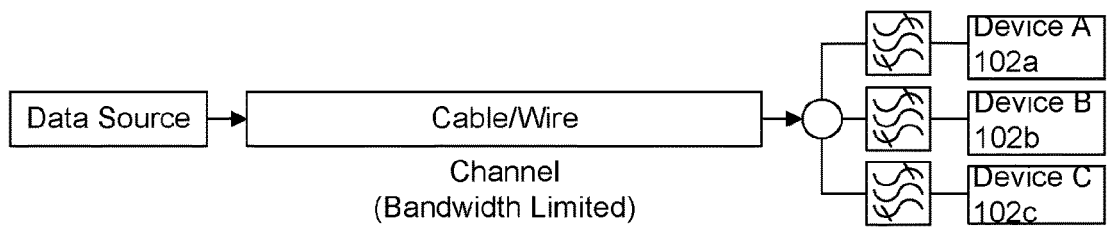
FIGS. 7A, 7B, and 7C illustrate network topology for a wireline network, a far-field wireless network, and a mid-field wireless network, respectively.
Figure 7B:
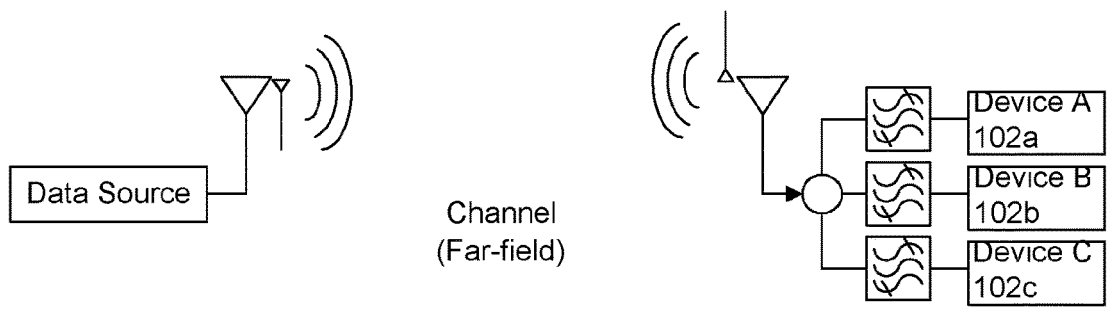
Figure 7C:
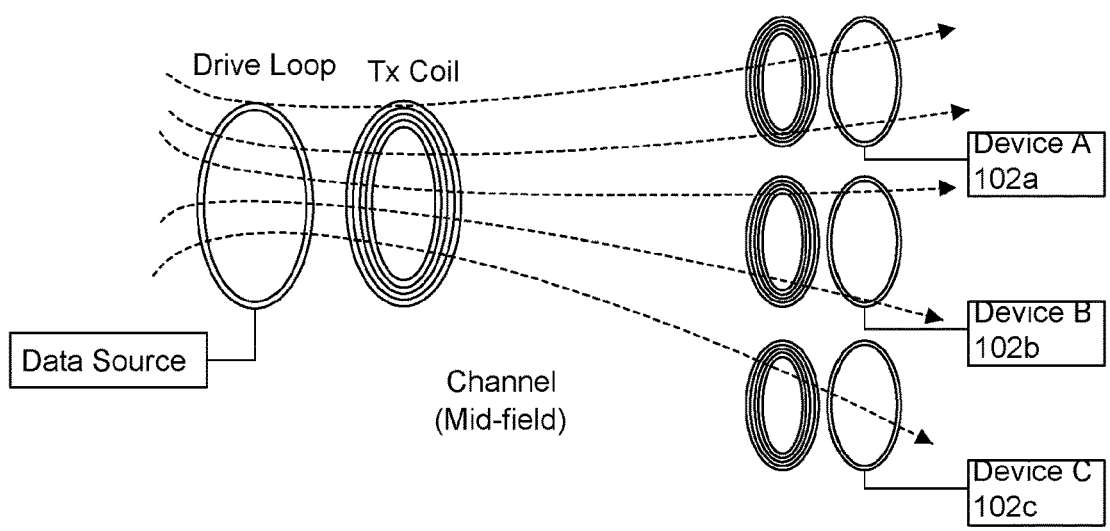

The three aforementioned data transmission frameworks, namely, wireline, far field, and/or mid-field, are shown in FIGS. 7A, 7B, and 7C, respectively.

A good analogy for the mid-field transmission framework may be a transformer with a primary coil and multiple secondary coils, in which the coupled power may be divided amongst the multiple receiving devices. The analogy is illustrated in FIGS. 8A and 8B, which are a loading model and a transformer representation of a plurality of load devices (e.g., WTRUs 102) coupled to a single power source, respectively. In this framework, the received signal may be dependent on the number of devices (e.g., WTRUs 102) coupled to the mid-field source and their loading effects. If a receiving device (e.g., WTRU 102) extracts significantly more than the minimum required signal power required to maintain a working data link, that power may not be available to a potentially "starving" link where the received signal strength may be below a minimum threshold. Load-based access control may facilitate a less wasteful allocation of signal energy, especially to devices (e.g., WTRUs 102) operating at the outer edge of a resonance magnetic cell or cluster.

Using the load termination state of devices (e.g., WTRUs 102) during transmission and/or reception cycles, a CLH (e.g., WTRU 501) may manage device-pairs in a unicast link to minimize interference between adjacent links. The load termination state of a device (e.g., WTRU 102) (e.g., essentially) may be the impedance (e.g., in Ohms) that it presents to another device (e.g., WTRU 102) to which it is magnetically coupled. This value may be dynamically set in order to control the resonance magnetic coupling efficiency between two devices. Load termination states may range from a matched conjugate termination value of 50 Ohms (e.g., in a 50 Ohms system), to a float-state where no energy may be absorbed/transferred to the device. The load termination state may take on multiple discrete values (e.g., $Z_1$, $Z_2$, ..., $Z_n$) between and including these two settings, e.g. 75 Ohms, 100 Ohms, etc.

After receiving a request for unicast link formation from device-pairs, the CLH (e.g., WTRU 501) may assign an RMC channel along with load termination states for any (e.g., each) device.

Additionally or alternately, the CLH (e.g., WTRU 501) may assign a table of load termination states, for example, as a function of signal strength threshold levels (e.g., RSSI or SNR) to any (e.g., each) pair of devices. During normal operation, as channel conditions vary, a device (e.g., WTRU 102) may independently select the correct load termination without direct intervention or instruction from the cluster head (e.g., WTRU 501).

The load termination state for the Tx cycle for a device (e.g., WTRU 102) may be different than the load termination state for the receive period of the device. The load termination state may also change from time period to time period. Unicast link TX/RX periods may be allocated amongst users according to priority levels, link quality, and/or data transfer rate needs.

2.1.3. Scheduling Functionality and Control Information

In a centralized framework, the cluster head (e.g., WTRU 501) may function as the Control Plane and may be responsible for creating a "routing/scheduling" table for data packet traffic between communicating device (e.g., WTRU 102) pairs. To facilitate the cluster head's function, any (e.g., each) data transfer period is preceded by a control period where a device (e.g., WTRU 102) in a cluster can share its capability and/or status with the cluster head (e.g., WTRU 501).

For example, during the control period, any of the following information may be exchanged with the cluster head (e.g., WTRU 501):

A request for link establishment with a specific device (e.g., WTRU 102) within the cluster or directly with the cluster head (e.g., WTRU 501);

Desired QoS requirements, including, e.g., a certain priority and/or reliability requirement;

Buffer status indicating how much information (e.g., needs) to be exchanged;

A channel quality metric as an indication of, e.g., a supported data and/or coding rate; and/or Capability information, such as supported load termination states and/or coupling coefficients.

Based on any of the link establishment requests, information provided, and/or available network resources, the cluster head (e.g., WTRU 501) may create any of a scheduling table with time slot assignments, load termination states for non-transmitting devices (e.g., WTRUs 102) in any (e.g., each) slot, and/or a synchronization signal for any (e.g., each) device. A grant access message may be sent to any (e.g., each) device-pair describing their behavior requirements in any (e.g., each) time-slot during the data transfer/exchange period.

For better resource allocation, Time Division Multiplexing (TDM) and/or Frequency Division Multiplexing (FDM) may be combined. For instance, any (e.g., each) link may be assigned a carrier frequency and the cluster head (e.g., WTRU 501) may further divide and/or allocate access times. As a result, two or more links may be time multiplexed on the same physical channel. The time slot usage may be proportionately divided amongst users based on any one or more of QoS (priority and/or reliability), data rate requirements, and/or buffer status.

To summarize, the CLH (e.g., WTRU 501) may act as a radio resource manager and allocate a data traffic channel (a radio channel and/or associated time-slot) for every device-pair once authentication, data requirements, and/or SNR contours have been reported over the pre-established Broadcast Channel (BCH).

FIGS. 9A and 9B illustrate two examples of a control frame format that is exchanged during the control period. FIG. 9A shows an exemplary format for scheduling and/or control. In this format, a device (e.g., WTRU 102) may report (e.g., transmit information indicating) any of: its ID, a requested QoS, the CQI, and/or a buffer status. FIG. 9B shows an exemplary format for a device (e.g., WTRU 102) to report (e.g., transmit information indicating) its capabilities to the cluster head (e.g., WTRU 501). In this format, a device (e.g., WTRU 102) may report (e.g., transmit information indicating) any of: its ID, the features that it may support, the load states that may be possible, and/or the coupling coefficients that may be possible for that device. There may be two approaches/strategies for time-slot allocation, either fixed or dynamic. These approaches are described below.

Fixed time-slot assignment strategies may be generally simple but may be inefficient due to the inability to reallocate slots to other devices (e.g., WTRUs 102) when not used (e.g., needed) in every frame. It may be challenging to generate fixed schedules for an entire cluster that may use (e.g., require) adjustments for (e.g., every) change in cluster topology or traffic characteristics.

Dynamic time-slot assignment strategies may allow devices (e.g., WTRUs 102) to access the medium on demand. In particular, traffic-adaptive protocols may increase network throughput and/or energy efficiency by determining when node devices (e.g., WTRUs 102) may be allowed to transmit, for example, based on information about the traffic on any (e.g., each) link. The last slot in the schedule may be used to announce the next schedule for the coming interval. However, such a strategy may add considerable overhead and/or complexity to the cluster head (e.g., WTRU 501).

FIGS. 10A and 10B illustrate exemplary content for a downlink control plane frame (e.g., from the CLH (e.g., WTRU 501) to the linked devices (e.g., WTRUs 102)) and an uplink control plane frame (e.g., from the devices to the CLH) in accordance with an embodiment. As shown in FIG. 10A, the downlink control frame may include any of slot assignments, load termination states, and/or schedule associated with any (e.g., each) device (e.g., WTRU 102) ID. As shown in FIG. 10B, any (e.g., each) device (e.g., WTRU 102) may acknowledge reception of the downlink control information, for example, by replying according to their assigned time slots.

2.1.4. Management of Load Termination States in an RMC System

In this section, using a centralized cluster framework where a cluster head (e.g., WTRU 501) may have already been selected, devices (e.g., WTRUs 102) supporting a plurality of (e.g., multiple) load termination states may consider load termination states as resources to be scheduled as part of resource allocation amongst cluster devices (e.g., WTRUs 102) to improve communication link performance. Two potential scenarios may be considered, one in which any (e.g., each) device (e.g., WTRU 102) may (e.g., only) support two (binary) load termination states (float/open and load/closed states) and another scenario in which any (e.g., each) device (e.g., WTRU 102) may support more than two load termination states.

2.1.4.1. Multiple Load Termination States Support

CLH Manacling Access to BCH with Multiple Load Termination States

In an embodiment, a cluster head (e.g., WTRU 501) may assign a load termination state to a specific device, for example, according to experienced SNR and/or Received Signal Strength Indicator (RSSI) level. The cluster head (e.g., WTRU 501) may request and/or receive SNR tables (contours) from any number of devices (e.g., WTRUs 102) (e.g., in a first step). The CLH (e.g., WTRU 501) may determine (e.g., in a second step) a reasonable load termination state for any (e.g., each) device (e.g., WTRU 102) based on the device's supported capabilities and/or experienced SNR/RSSI level over the BCH. In this example, load termination states may range from a matched conjugate termination value of 50 Ohms (e.g., in a 50 Ohms system), to a float-state where, for example, no energy is absorbed/transferred to the device. The load termination state may then take-on a plurality of (e.g., multiple) discrete values (e.g., Z1, Z2, . . . , Zn) between and including these two settings, e.g. 75 Ohms, 100 Ohms, etc.

For example, for a device (e.g., WTRU 102) that receives a signal strength (e.g., RSSI) that may be much greater than a minimum threshold and/or above a second threshold, the cluster head (e.g., WTRU 501) may assign a load termination state such that the signal power delivered to the device (e.g., WTRU 102) will be reduced to a level below the aforementioned second threshold. This may be helpful because the excess or unused energy may remain available in the magnetic field for other cluster members to extract, as needed. In another example, for a device (e.g., WTRU 102) that may receive a signal with a strength that is marginally above the defined minimum threshold, the CLH (e.g., WTRU 501) may assign the optimum load termination state, e.g. 50 Ohms, for example, in order to enable maximum power transfer to that device.

Figure 11:
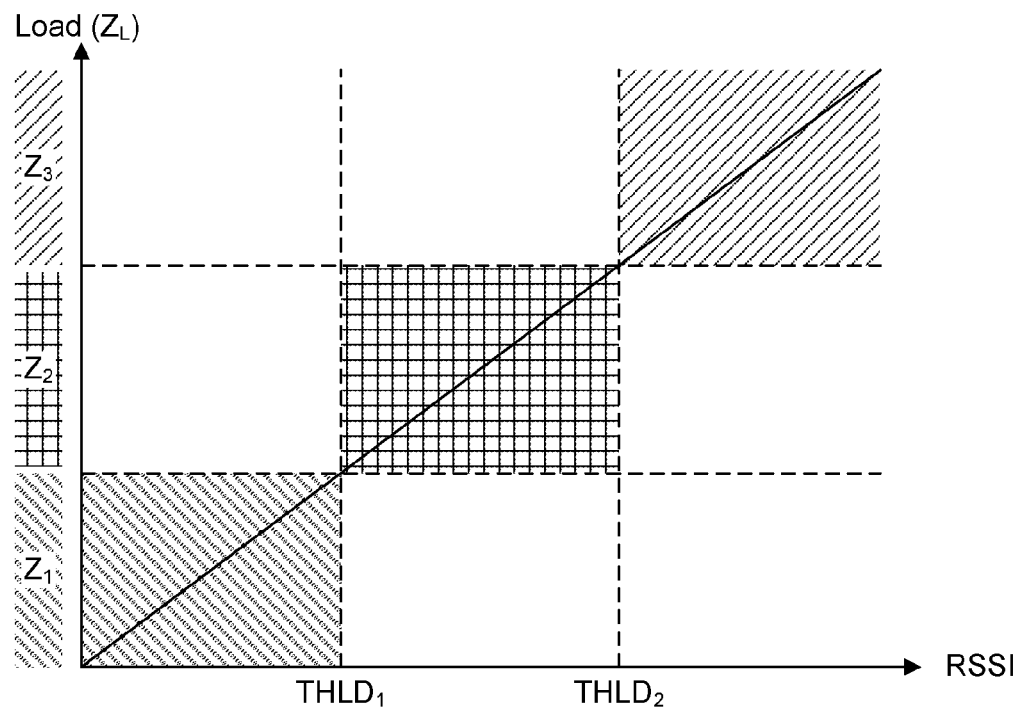
FIG. 11 is a graph illustrating load termination state assignment as a function of signal strength in accordance with one embodiment.

The above described scenario/example is illustrated in FIG. 11, in which an exemplary device (e.g., WTRU 102) may support three load termination states ($Z_1$, $Z_2$, $Z_3$). For example, after (e.g., when) received signal strength is below THLD1, the device (e.g., WTRU 102) may switch to an optimal load termination state, $Z_1$ (e.g., 50 Ohms). For RSSI level between the two thresholds (THLD1 and THLD2), the load state may be set to a slightly mismatched value $Z_2$ (e.g., 30, 40 or 75 Ohms). For very strong RSSI values, e.g., above THLD2, the load state may switch to a sub-optimal value of $Z_3$ (e.g., 100 Ohms), where, "excess" signal power may be not extracted from the resonance magnetic medium and/or may remain available for use by other devices (e.g., WTRUs 102) coupled to the channel.

Figure 12:
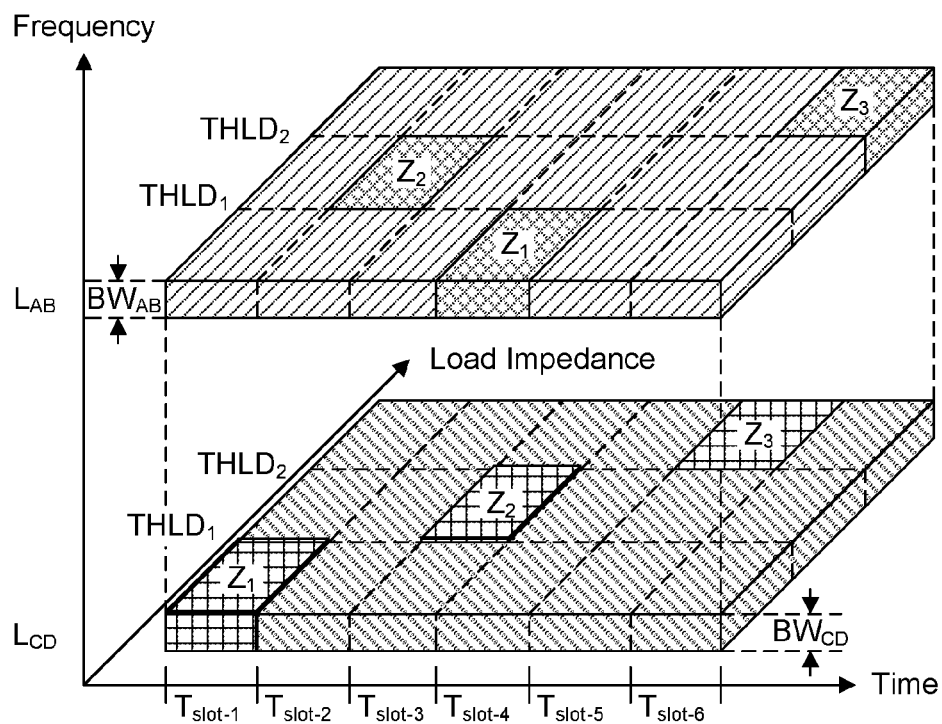
FIG. 12 is a graph illustrating a scheme for load termination state assignments for multiple devices in multiple time slots in accordance with one embodiment.

In various embodiments, at the cluster creation/formation phase, the CLH (e.g., WTRU 501) may assign a table of load termination states versus threshold levels to any (e.g., each) cluster member device. During normal operation, a device (e.g., WTRU 102) may autonomously and/or dynamically select the correct load termination without direct intervention or instruction from the cluster head (e.g., WTRU 501). This is illustrated in FIG. 12. For example, during Tslot−1, link LAB is not coupled to the channel and link LCD's load termination may be set according to the current, or previously measured, SNR/RSSI level between devices (e.g., WTRUs 102) C and D. For example, if the SNR/RSSI is below THLD1, the termination may be set to Z1, if SNR/RSSI is between THLD1 and THLD2, the termination may be set to Z2, etc. The difference is that the threshold setting may be semi-static as opposed to a dynamically changing threshold based on, e.g., number of cluster members, channel conditions, traffic activity, etc. All devices (e.g., WTRUs 102) may have the same load termination states capabilities.

In various embodiments, for improvement in resource utilization on the Broadcast Channel, the CLH (e.g., WTRU 501) may assign time slots with associated load termination states for any (e.g., each) device. The CLH (e.g., WTRU 501) may broadcast a schedule to all cluster devices (e.g., WTRUs 102) listing respective device (e.g., WTRU 102) load termination states during any (e.g., each) time slot and/or transmission period. A plurality of (e.g., multiple) devices (e.g., WTRUs 102) may be time multiplexed on the same physical channel. The time slot usage may be proportionally divided amongst users based on priority and/or data rate requirements.

In various embodiments, the cluster head (e.g., WTRU 501) may monitor the average SNR of devices (e.g., WTRUs 102) in the cluster and may determine if (e.g., when) the average cluster SNR on BCH falls below a threshold and/or the number of members in the cluster exceeding a predetermined count. When the condition is met, the CLH (e.g., WTRU 501) may create N subgroups of devices (e.g., WTRUs 102), assigning devices (e.g., WTRUs 102) to any (e.g., each) group, where one group may access the Broadcast Channel at a given time, resulting in an improved average SNR.

Figure 13:
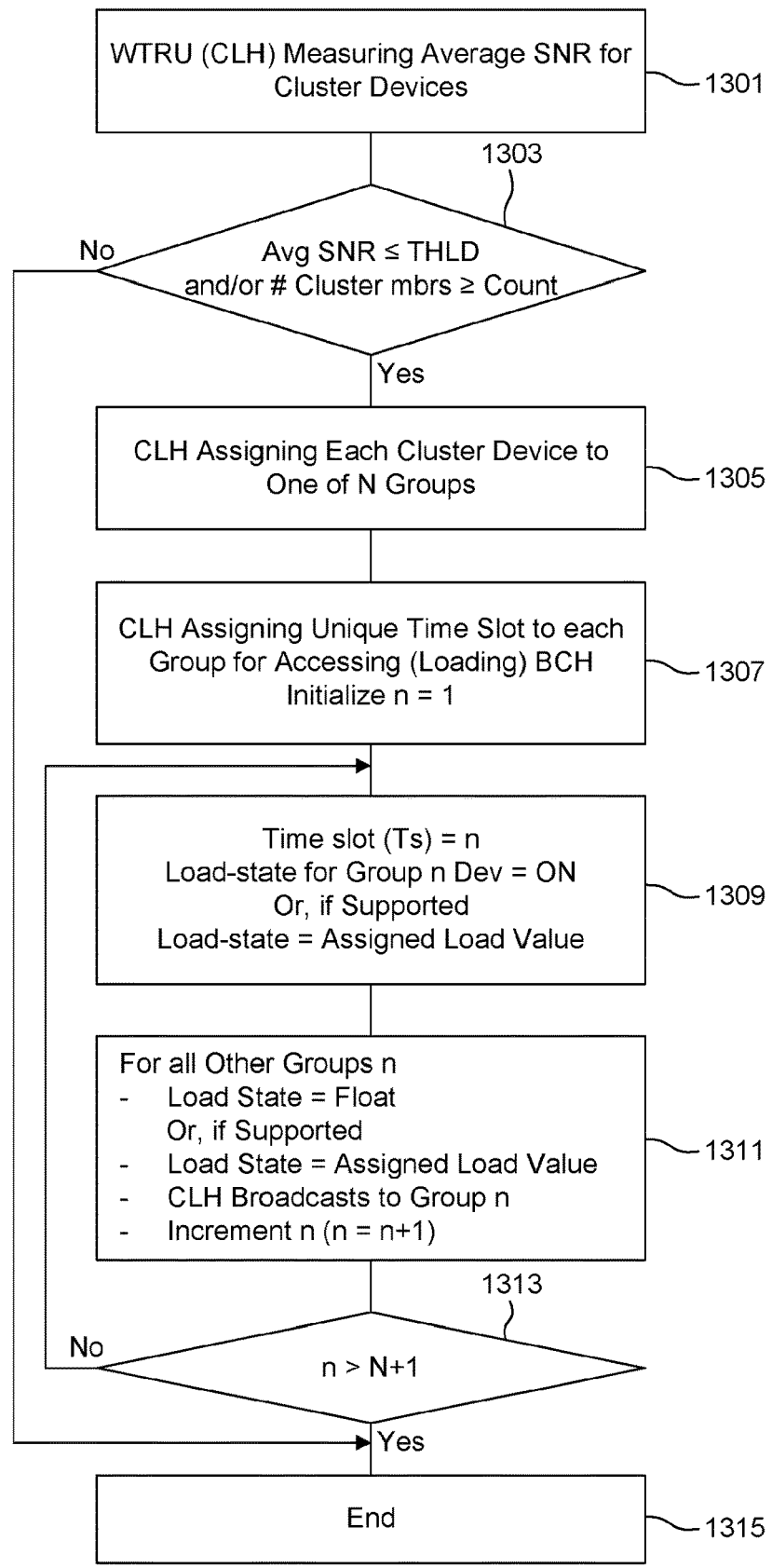
FIG. 13 is a flowchart illustrating sharing of the BCH among multiple devices in accordance with one embodiment.

Such an embodiment is illustrated in the flowchart of FIG. 13. At 1301, the CLH (e.g., WTRU 501) may measure the average SNR for the devices (e.g., WTRUs 102). At 1303, the CLH (e.g., WTRU 501) may determine if the average SNR is below a threshold. The CLH (e.g., WTRU 501) may break the devices (e.g., WTRUs 102) down into N sub groups (1305). At 1307, the CLH (e.g., WTRU 501) may assign a unique time slot to any (e.g., each) of the N groups for accessing the BCH and may set a counter to n=1. At 1309, the CLH (e.g., WTRU 501) may set the time slot to n and/or the load termination state for group n to LOAD (or ON) for that time slot (or, in a system with a plurality of (e.g., multiple) load termination states, to one of the predetermined load termination states, e.g., the most preferable one). At 1311, the CLH (e.g., WTRU 501) may set the load termination state of all other sub groups to FLOAT (or OFF) for that time slot (or, if the system supports a plurality of (e.g., multiple) load termination states, to another load termination state value), may broadcast the relevant control and/or configuration information to the devices (e.g., WTRUs 102) in sub group n, and may increment the counter. At 1313, the CLH (e.g., WTRU 501) may determine if it has assigned any (e.g., each) sub group a time slot for using the BCH. If not, flow may proceed back to step 1309 so that the any (e.g., each) sub group is assigned a time slot in which to use the BCH. Otherwise, it may return to normal operation.

Figure 14:
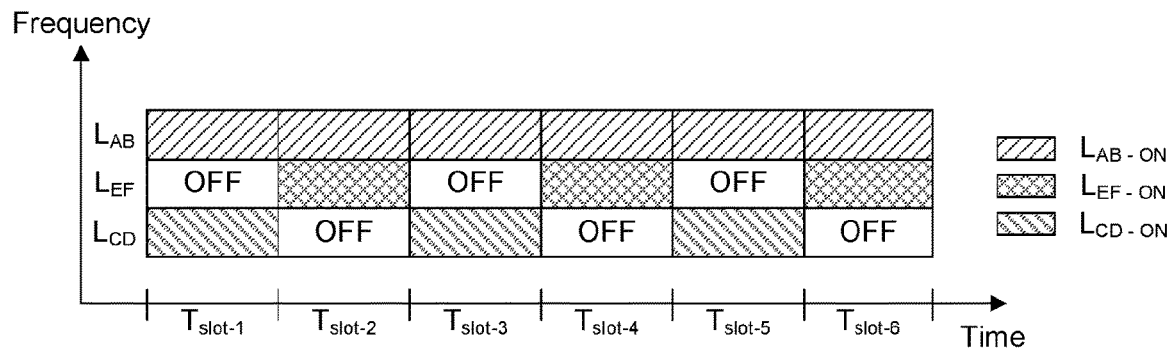
FIG. 14 is a diagram illustrating load termination states of three devices over a period of 6 times slots in accordance with one embodiment.
Figure 15:
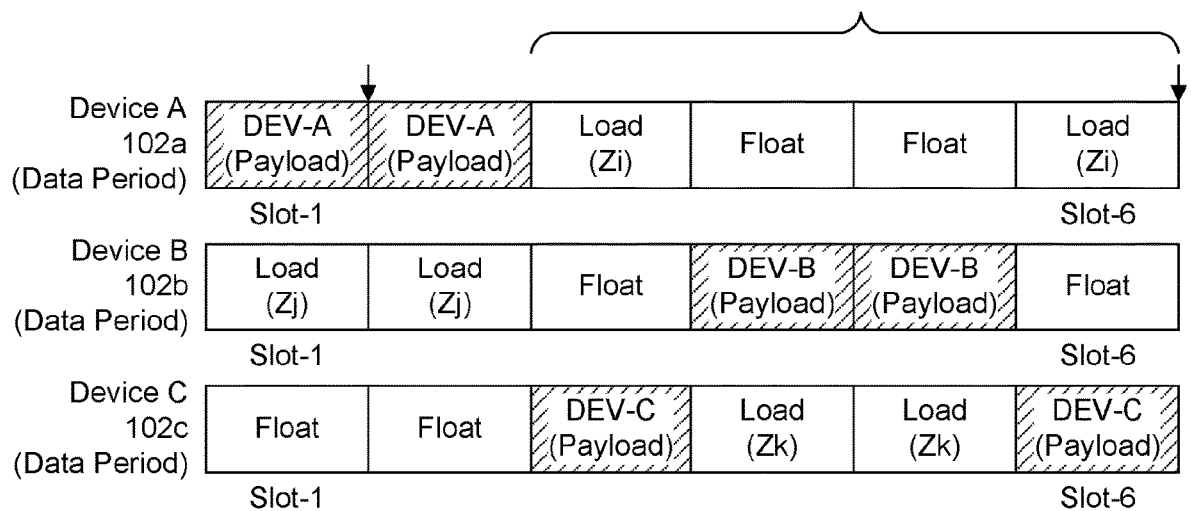
FIG. 15 is a diagram illustrating load termination states of three devices over a period of 6 times slots in accordance with another embodiment.

The data scheduling period along with device (e.g., WTRU 102) loading behavior may be structured by the cluster head (e.g., WTRU 501) using information, for example, collected from cluster devices (e.g., WTRUs 102) during the control period. FIGS. 14 and 15 show examples. In the scenario shown in FIG. 14, the system may support a binary load termination state, wherein link AB ($L_{AB}$) may be (e.g., continuously) on, whereas, links LEF and LCD may be active during their allocated time slots, for example, according to a schedule generated by the CLH 102a.

Another example of device (e.g., WTRU 102) load termination states during a transmit period is illustrated in FIG. 15. In this example, device A (e.g., WTRU 102a) may transmit data in slots 1 and 2, "FLOAT"s its coil in slots 4 and 5 and "LOAD"s the magnetic medium in slots 3 and 6 with an assigned load termination supported value of Zi. Similarly, device B (e.g., WTRU 102b) may transmit data in slots 4 and 5, while, in this example, device A (e.g., WTRU 102a) may remain in "FLOAT" state. Device C (e.g., WTRU 102c), recruited as a facilitator, may load the medium with an assigned termination impedance value of Zk. Device C (e.g., WTRU 102c) may get to transmit in the remaining time slots 3 and 6 with device A acting as a facilitator terminated with value of $Z_i$.

Figure 16:
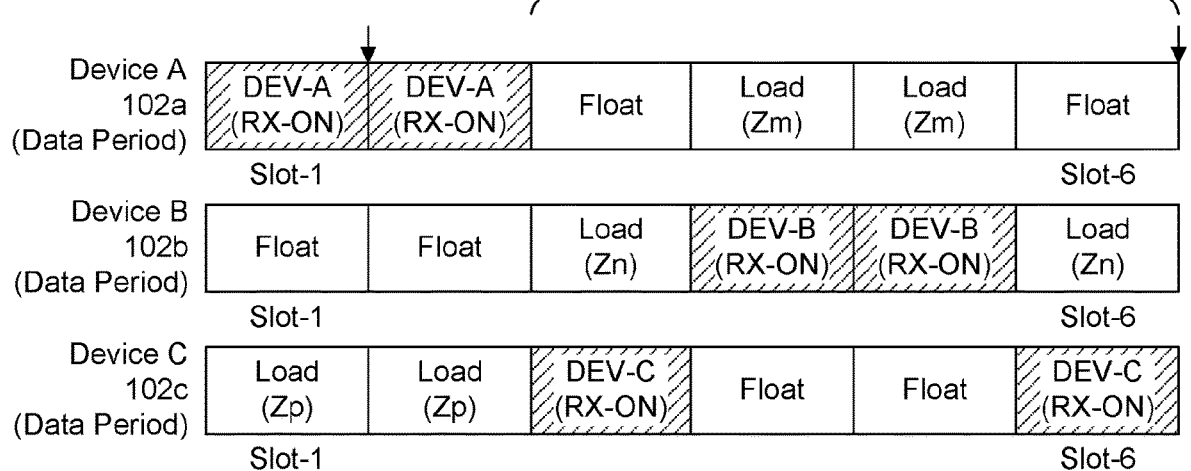
FIG. 16 is a diagram illustrating load termination states of three devices over a period of 6 times slots in accordance with yet another embodiment.

Yet another example of device load termination states during a transmit period is illustrated in FIG. 16. In this example, during a receive period, device A (e.g., WTRU 102a) may receive data in slots 1 and 2, FLOATs its coil in slots 3 and 6 to free-up medium resources, and LOADs the medium with Z m in slots 4 and 5 in support of device B during its own receive cycle. Device B may receive data in slots 4 and 5, FLOATs during slots 1 and 2, and may present a load termination of to the medium in slots 3 and 6, thus supporting device C's receive periods. Finally, device C (e.g., WTRU 102c) LOADs the medium in slots 1 and 2 with an assigned impedance value of 4, FLOATs during slots 4 and 5, and may receive in slots 3 and 6.

Mobility Control

A device's mobility within the cluster may affect (e.g., both) its received signal strength and/or the link quality of adjacent device-pairs. The cluster head (e.g., WTRU 501) may implement control procedures to mitigate the impact of mobile devices (e.g., WTRUs 102) on the overall cluster performance.

For example, after receiving a change in link quality report (e.g., SNR or RSSI falling below a pre-determined threshold) from a device (e.g., WTRU 102) on the broadcast channel, the CLH (e.g., WTRU 501) may proceed to determine and/or send re-balancing instructions to the device, e.g., adjustment to any of the following settings:

- Coupling factor;
- Load termination state;
- Assigned time slots; and/or
- Center frequency.

The exact change to the above settings may be based on newly reported SNR versus frequency curves in tabular form. The cluster head (e.g., WTRU 501), using these curves, may assess changes in channel responses, including bandwidth and Q and determine the best settings for new induced channel characteristics. Subsequently, the device (e.g., WTRU 102) may send the CLH (e.g., WTRU 501) an updated report, with new SNR/RSSI measurements, presumably confirming an improvement in the link quality.

CLH Handling Request for Unicast Link Formation

In various embodiments, the CLH (e.g., WTRU 501) may receive a request from a device (A) (e.g., WTRU 102a), to form a unicast link with another device (B) (e.g., WTRU 102b). The CLH (e.g., WTRU 501), using existing or updated SNR tables along with new link information and/or energy transfer requirements, may assign a channel for the unicast link formation and/or determine a load termination state for devices (e.g., WTRUs 102) A and B to minimize potential interference to other concurrently running unicast links. The CLH (e.g., WTRU 501) may transmit time slot assignments to the device-pair to further reduce interference or maximize cluster resource utilization.

2.1.4.2. Binary Load Termination States Support

CLH Managing Devices Supporting Binary Load Termination States (e.g., Only)

Since, devices (e.g., WTRUs 102) in Float-State may not receive transmissions on the BCH, a form of scheduled access is desirable.

In various embodiments, devices (e.g., WTRUs 102) (e.g., only) supporting binary load termination states may be present, e.g., Float (Open) or Load (Closed). The CLH (e.g., WTRU 501) may divide the cluster into two or more groups to potentially accommodate a larger number of devices (e.g., WTRUs 102) on the BCH. The cluster head (e.g., WTRU 501) may assign devices (e.g., WTRUs 102) to any (e.g., each) group based on the ability to (e.g., simultaneously) couple to the BCH, for example, with a SNR/RSSI above a minimum threshold. The CLH (e.g., WTRU 501) may generate a schedule with a time slot assignment for any (e.g., each) group, during which devices (e.g., WTRUs 102) of a group may couple and/or load the BCH to receive broadcast transmissions from the CLH (e.g., WTRU 501) or other devices (e.g., WTRUs 102) in the group. To reach any of (e.g., all) cluster devices (e.g., WTRUs 102), the CLH (e.g., WTRU 501) may re-broadcast its control information and/or instructions in any (e.g., each) time slot, for example, in accordance with the schedule.

In various embodiments, at the cluster creation/formation phase, the CLH (e.g., WTRU 501) may also create sub-groups along with a schedule, and/or assign a table of load termination states versus threshold levels to any (e.g., each) sub-group member device. During normal operation, members of a sub-group may autonomously and/or dynamically select the correct load termination states without direct intervention or instruction from the cluster head (e.g., WTRU 501).

Device Perspective

Figure 17:
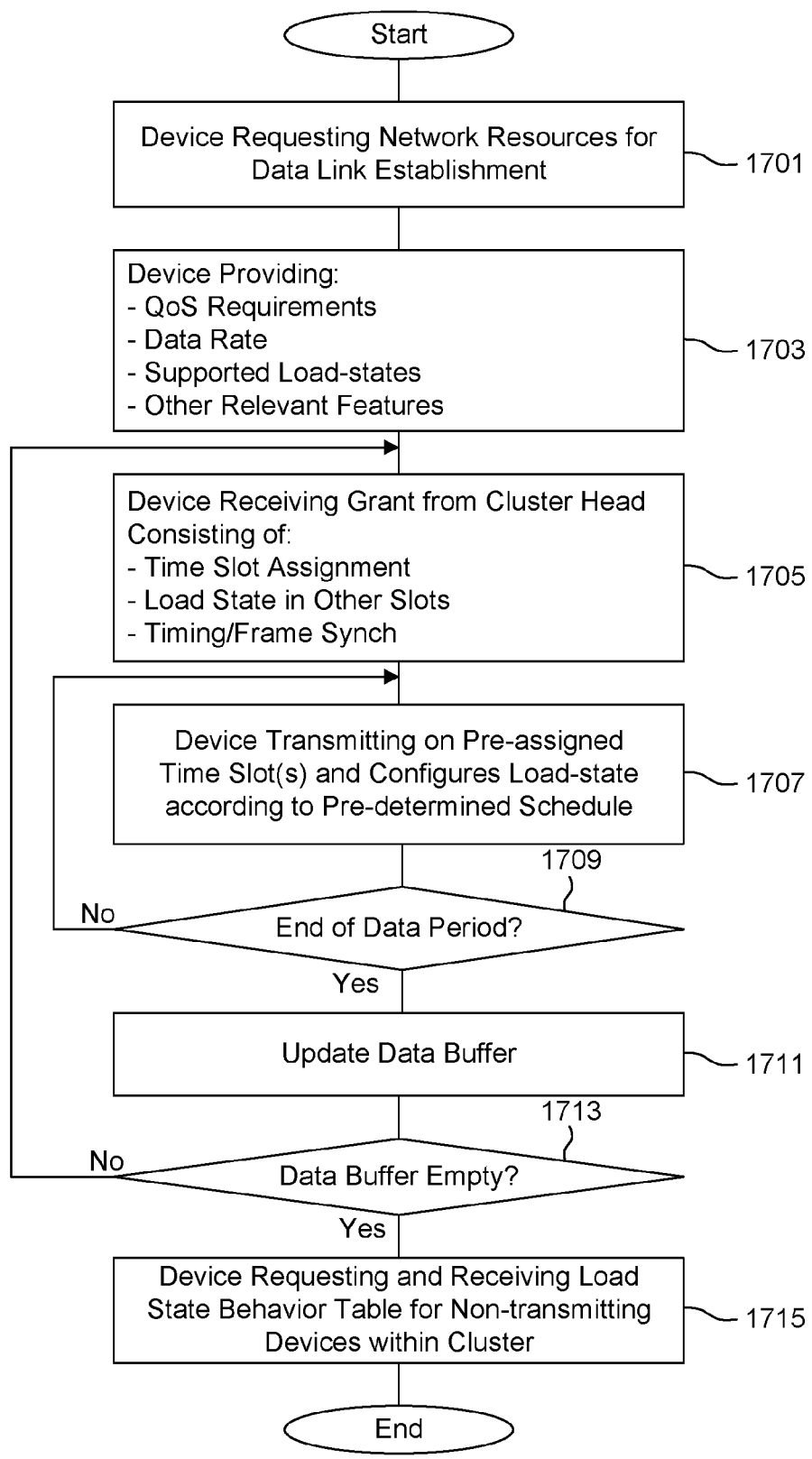
FIG. 17 is a flowchart illustrating a load-based access scheme from the device perspective in accordance with one embodiment.

An exemplary embodiment of a load-based access scheme from the device (e.g., WTRU 102) perspective is shown in FIG. 17. In a step (1701), the device (e.g., WTRU 102) may request network resources to establish a data link. If not already available to the CLH 102a, the device, may send any of: its supported load termination states, QoS requirements, supported data rates, and/or coupling coefficients (1703). The device (e.g., WTRU 102) may receive a grant from CLH (e.g., WTRU 501) comprising any of: time slot assignment, load termination state during transmit cycles and/or load termination state in non-transmitting periods, and/or timing and/or synchronization settings (1705). In a step (1707), the device (e.g., WTRU 102) may transmit in the assigned time slot(s), for example, with load termination states configured according to pre-determined values for any (e.g., each) period. The data buffer may be updated at the end of any (e.g., each) transmission period (1709 and 1711). After (e.g., when) the transmit cycle ends, e.g., the data buffer may be empty (1713), the device (e.g., WTRU 102) may switch to supporting mode using pre-assigned load termination state for non-transmit mode (1715).

2.2. CONCURRENT DELIVERY OF ENEMY AND INFORMATION IN RMC SYSTEMS

The main challenge with RMC networks may be in the simultaneous transfer of power and information. The discussion above considers the communication related transmissions of RMC where information may be sent and received between a plurality of devices (e.g., WTRUs 102) within a cluster without consideration of power transfer. When energy harvesting capabilities are introduced in a cluster; where generally, a strong continuous wave (CW) tone, or other power optimized waveform, may be in the presence of a usually weaker information-carrying signal. The CW tone may behave like a jammer and/or interfere with the reception of the information signal.

2.2.1. Magnetic Coupling Domain Multiple Access (MC-DMA)

This section describes methods, apparatus, and techniques for taking advantage of a new class of load-states and load management schemes for medium access, and introduces a concept of Magnetic Coupling Domain Multiple Access (MC-DMA) into the afore described resonant magnetic framework to enable this new class of load termination states.

Figure 18:
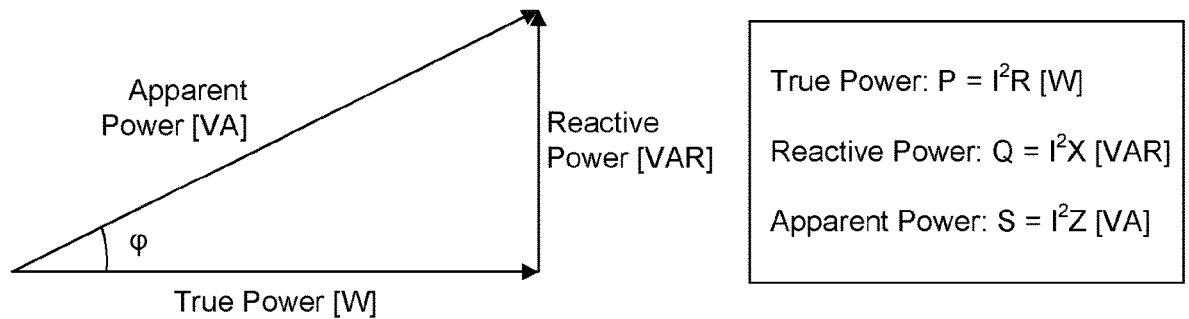
FIG. 18 is a graphic representation of the relationship between real, reactive, and apparent power in a system.

The near ideal orthogonality between real and reactive power is well understood in power transmission and distribution circuit analysis. FIG. 18 depicts the relationship between real, reactive, and apparent power. The ratio of the true (or real) power, dissipated at the load, to the apparent (or total) power, supplied by the source, is defined as the power factor. For sinusoidal waveforms, the power factor is the cosine of the angle φ between true power and apparent power. For a purely resistive load, the voltage and current are in phase, and the apparent power and true power are equal. However, a purely reactive load may result in a power factor of zero, since current and voltage will be 90 degrees out-of-phase.

Power may be expressed in complex form as shown in the following equation:

$$S=P+jQ \quad (17)$$

where, P is the true power and Q the reactive power.

2.2.2. Leveraging of Complex Load Termination States

A complex impedance may comprise two parts: the real or resistive part dissipating active power (e.g., heat), and the imaginary part comprising an inductive or capacitive reactance or both, which is frequency dependent and responsible for the reactive power present in the circuit. The reactive power may be generated by a current charging a capacitor, or creating a magnetic field around a coil. This current may be out of phase with the voltage.

A device (e.g., WTRU 102) with a complex load impedance termination may simultaneously harvest energy with the real part of its load termination and/or receive information by coupling or tapping into the reactive power available in the magnetic field induced by the WTRU or a cluster head (e.g., WTRU 501).

Similarly, a number of devices (e.g., WTRUs 102), based on their respective requirements, may harvest energy by coupling a resistive load to the resonant magnetic field emanating from a WTRU while other devices (e.g., WTRUs 102), instead, use complex load impedance terminations, mostly reactive with small resistive components, to extract signal energy from the magnetic field.

Although most of the discussion herein is written in terms of an exemplary embodiment in which different devices (e.g., WTRUs 102) simultaneously transfer data and energy harvest, it should be noted that any single device (e.g., WTRU 102) also may simultaneously conduct data transfer and energy harvesting in accordance with the principles disclosed herein.

Figure 19:
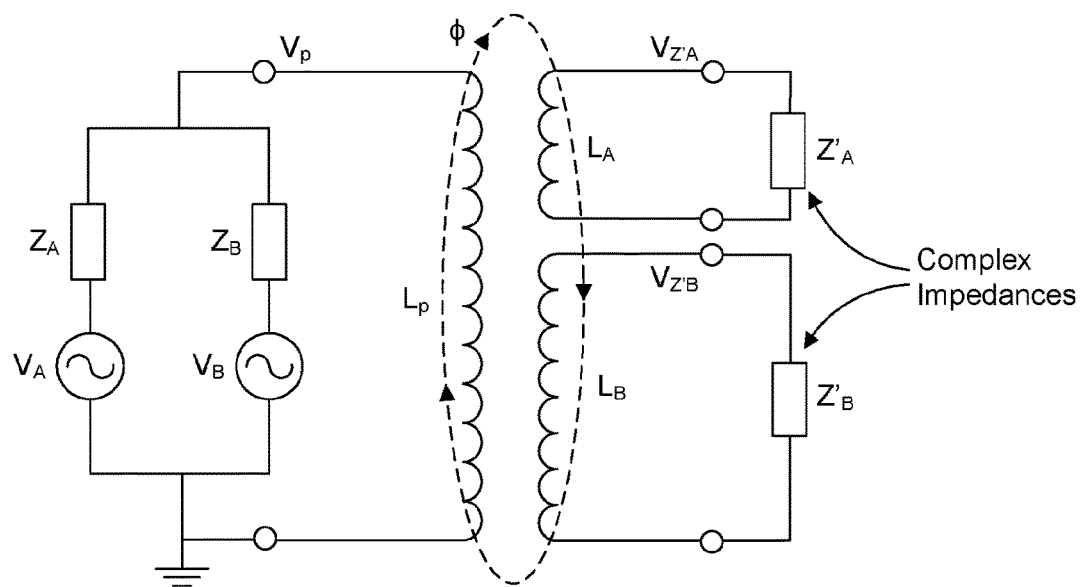
FIG. 19 is a circuit diagram of a model circuit for simultaneous transfer of power and information in accordance with one embodiment.

FIG. 19 illustrates the concept of magnetic coupling domain multiple access in accordance with an embodiment. On the primary side of the transformer, voltage source $V_A$ with an internal complex impedance value of $Z_A$, and voltage source $V_B$ with an internal impedance value of $Z_B$, may be linearly combined or added to produce an input signal to the primary side of the resonant magnetic circuit model. The secondary side of the transformer may comprise two windings, $L_A$ terminated with impedance $Z'_A$ and $L_B$ terminated with complex impedance $Z'_B$.

Figure 20:
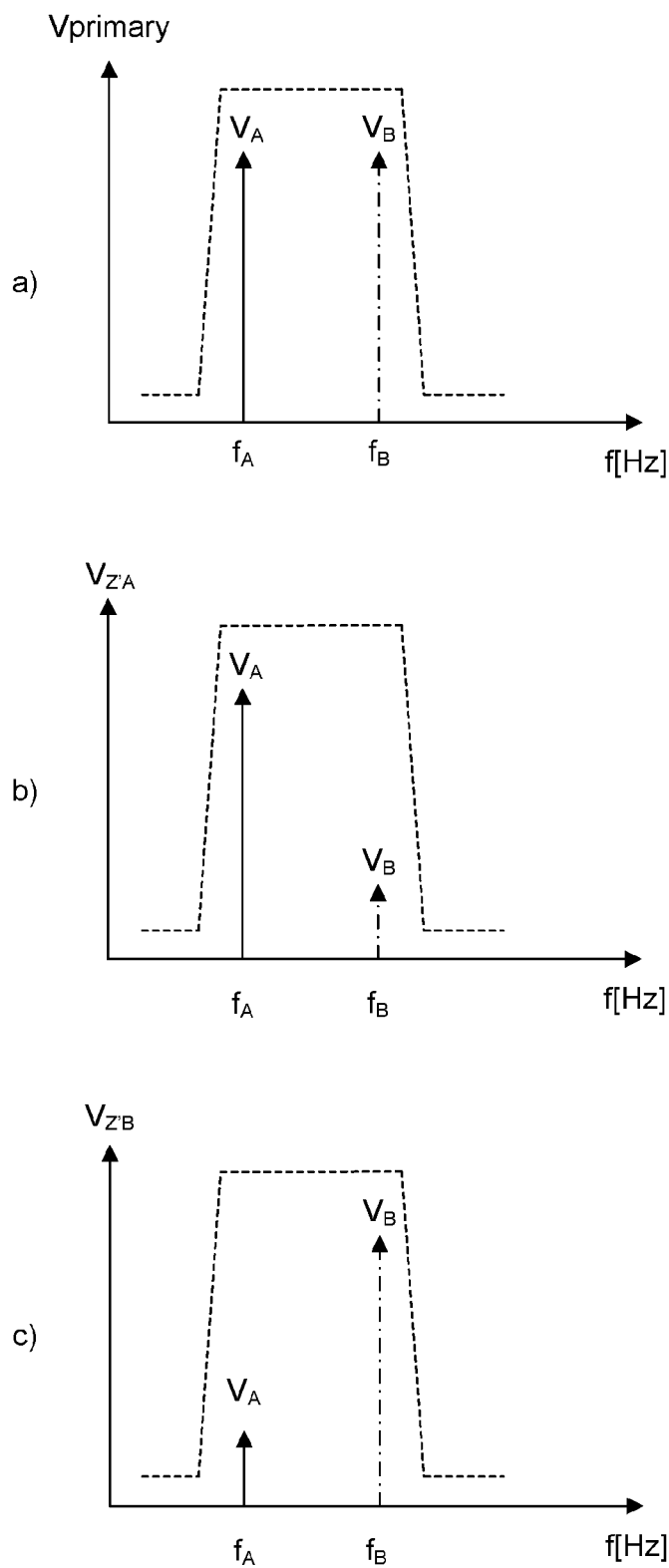
FIG. 20 is a flowchart describing a procedure for selecting a complex impedance for energy harvesting or communication. in accordance with one embodiment.

FIG. 20 depicts voltage signals associated with the circuit model of FIG. 19. Part a of FIG. 20 shows a voltage source $V_A$ running at frequency $f_A$, and source $V_B$ at frequency $f_B$ are shown. Part b of FIG. 20 shows the voltage component associated with any (e.g., each) source measured across the complex load $Z'_A$ of FIG. 19. When $Z'_A$ is equal to $Z^*_A$ (where $Z^*_A$ is the complex conjugate match of $Z_A$ of the source $V_A$), it obtains an optimal match, and therefore maximum power transfer can take place from source $V_A$ to the load $Z'_A$.

However, the component of source $V_B$ delivered across $Z'_A$ may be very small since its source impedance $Z_B$ is not a conjugate match to the load $Z'_A$. As a result, we may observe a tiny fraction of the source voltage $V_B$ delivered to the load $Z'_A$.

Similarly for $Z'_B$, as shown in part c of FIG. 20, the impedance $Z_B$ of the voltage source $V_B$ is a complex conjugate and results in maximum power transfer. However, $Z_A$ from the source $V_A$ is not a perfect match and potentially may result in a severe attenuation of that voltage across $Z'_B$.

Therefore, careful selection of source and load complex impedances may help enable this magnetic coupling domain multiple access (or MC-DMA) scheme, by selectively presenting an optimal load termination for a desired signal and presenting, practically, and open circuit to unwanted signals. A complex load impedance termination may be represented by an equivalent series or parallel R, L, C passive network, where the passive components may comprise, e.g., a combination of electronically selectable or tunable components connected to arrive at, or approximate, the desired impedance value.

Figure 21:
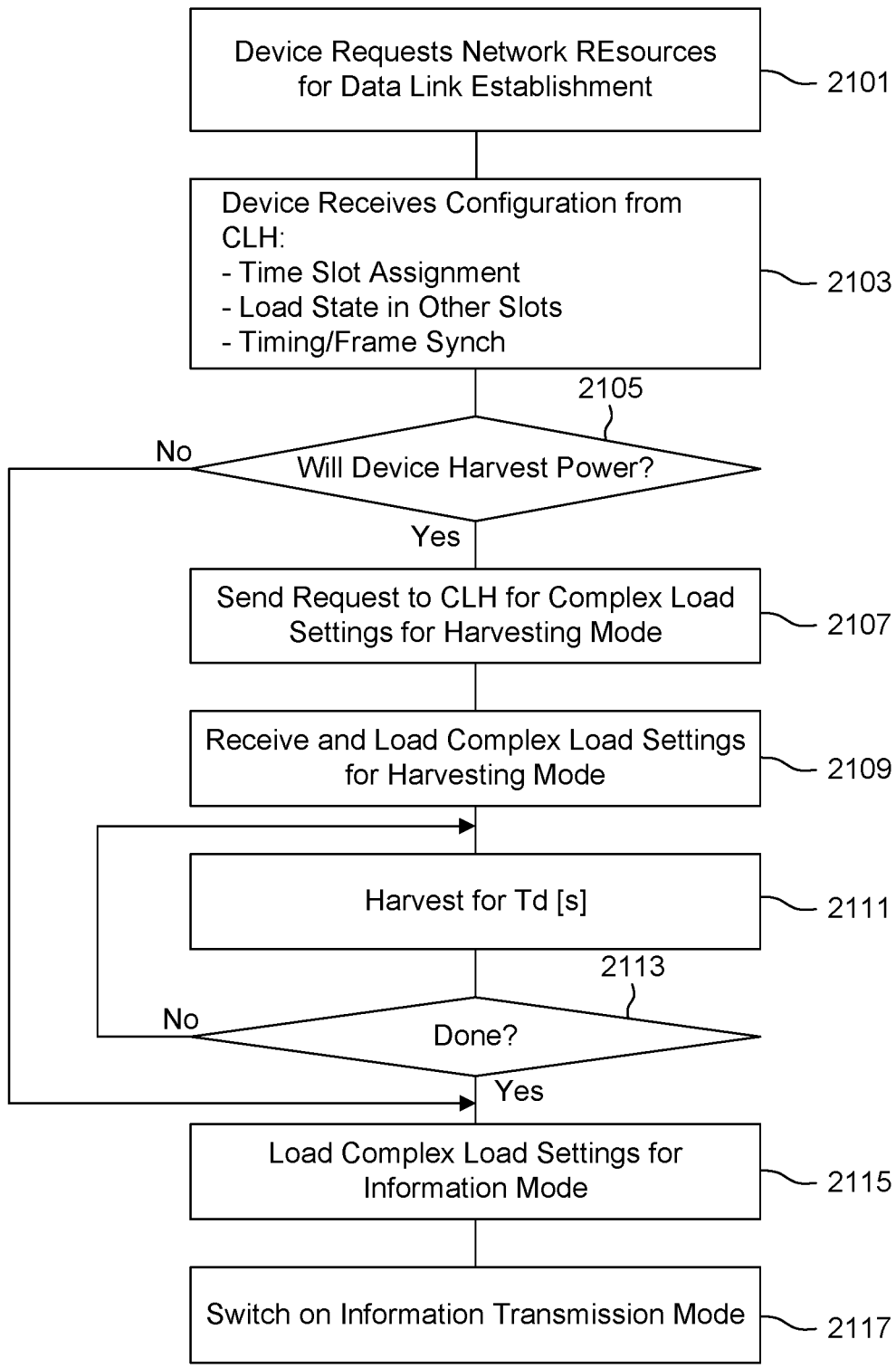
FIG. 21 is a flowchart describing the procedure for selecting a complex impedance for energy harvesting or communication in accordance with one embodiment.

FIG. 21 is a flowchart describing the procedure for selecting a complex impedance for energy harvesting or communication. At 2101, a device (e.g., WTRU 102) may request network resources for establishing a data link with the network. At 2103, the device (e.g., WTRU 102) may receive a configuration from the CLH 102*a*, which may include any of: a time slot assignment, timing/frame synchronization data, and/or information about the load state in other time slots. The information about the load state in other time slots may be useful to the device (e.g., WTRU 102) in determining what its load state should be in timeslots in which it is not transmitting insofar as the cluster head (e.g., WTRU 501) may want this device (e.g., WTRU 102) to unload the resonant magnetic medium (or couple suboptimally) to free-up energy/power of other devices (e.g., WTRUs 102).

At 2105, the device (e.g., WTRU 102) may determine whether or not it will harvest power from the CLH 102*a*. If it will harvest power, flow may proceed to 2107, where the device (e.g., WTRU 102) may inform the CLH (e.g., WTRU 501) that it wishes to harvest energy (effectively a request for the CLH (e.g., WTRU 501) to transmit to the device (e.g., WTRU 102) a complex load setting optimized for energy harvesting). At 2109, the device (e.g., WTRU 102) may receive and set itself to the load setting received from the CLH (e.g., WTRU 501) (e.g., a complex impedance state optimized for power harvesting without interfering with other information signals being transmitted/received by the CLH 102*a*). This load impedance preferably may be selected such that it presents an ideal conjugate match to the energy source (e.g., the CW signal), but a near-open circuit to the information source. Next, the device (e.g., WTRU 102) may start harvesting energy from the CW signal.

An energy harvesting scheme may be implemented in any number of ways. In one embodiment illustrated in the flowchart, the device (e.g., WTRU 102) harvests energy for a predetermined period of time, e.g., Td seconds (step 2111). At the end of that period, the device (e.g., WTRU 102) may determine if the charging cycle is to be ended (step 2113). This may occur when the device (e.g., WTRU 102) has harvested what it deems to be an adequate amount of power. In various embodiments, step 2113 may include the device (e.g., WTRU 102) listening to the Broadcast Channel (BCH) every Td seconds for potential control messages coming from the CLH (e.g., WTRU 501) (e.g., there may be a request to temporarily halt energy harvesting or modify settings). If, in step 2113, there is no relevant instruction on the BCH to halt charging and/or the desired level of charging has not yet been reached, charging may continue for another Td period. The process may repeat until completion of the charging cycle.

After (e.g., when) the energy harvesting cycle is finished, then flow may proceed from step 2113 to step 2115, in which the device (e.g., WTRU 102) may configure itself with the complex load settings optimized for information transfer and may commence information transmission/reception in the assigned time slots (2117). The impedance for this scenario may present a conjugate load match to the information source, but a near-open circuit to the energy harvesting voltage source.

The optimal complex load impedance determined by the CLH (e.g., WTRU 501) (and transmitted to the device) may have different values for transmitting and for receiving. In particular, it may depend on signal quality factors, such as SNR, RSSI. Also, the CLH (e.g., WTRU 501) may determine a power budget that may support the various energy transfer and/or information transfer requests that it has received from the various devices (e.g., WTRUs 102), and this also potentially may have bearing on the CLH's determination of load impedance states for the various devices (e.g., WTRUs 102).

In an embodiment, the device (e.g., WTRU 102) may receive from the CLH (e.g., WTRU 501) the load settings for transmission and reception of data at the same time that it may receive the load setting for power harvesting. In an embodiment, it may send another load setting request to the CLH (e.g., WTRU 501) (and receive the load settings for transmission and reception of data) in conjunction with step 2115 so that the load settings may be based on the most recent SNR and/or RSSI.

Returning to step 2105, if the device (e.g., WTRU 102) does not intend to harvest energy from the CLH 102*a*, then flow may proceed from step 2105 (e.g., directly) to steps 2115 and 2117 to configure itself with the complex load settings optimized for information transfer and/or commence information transmission/reception in the assigned time slots.

2.2.3. Selection and Allocation of EH Channel for CW Tone

A CLH (e.g., WTRU 501) may designate a dedicated frequency or range of frequencies for a CW tone used for energy harvesting. Broadcast and all unicast data links may operate outside of that range. When the devices (e.g., WTRUs 102) wish to harvest energy rather than transfer data, they may adjust their coupling and load termination to maximize harvested energy from the CW tone. In the presence of relatively strong CW levels as compared to the data signal strengths, devices (e.g., WTRUs 102) in unicast links may weakly couple or load the CW, while still harvesting at an adequate regime. This is illustrated in part a of FIG. 22.

In various embodiments, a CLH (e.g., WTRU 501) may dynamically select and/or allocate a channel for an energy CW tone while accounting for and minimizing effect on adjacent links signal quality. Alternately or additionally, the CLH (e.g., WTRU 501) may request devices (e.g., WTRUs 102) to move to a new center frequency to establish better communication links with minimalized interference from the CW power tone, as shown in part b of FIG. 22. The CLH (e.g., WTRU 501) may move the CW tone to a new frequency in the band, as the cluster topology changes over time.

Figure 22:
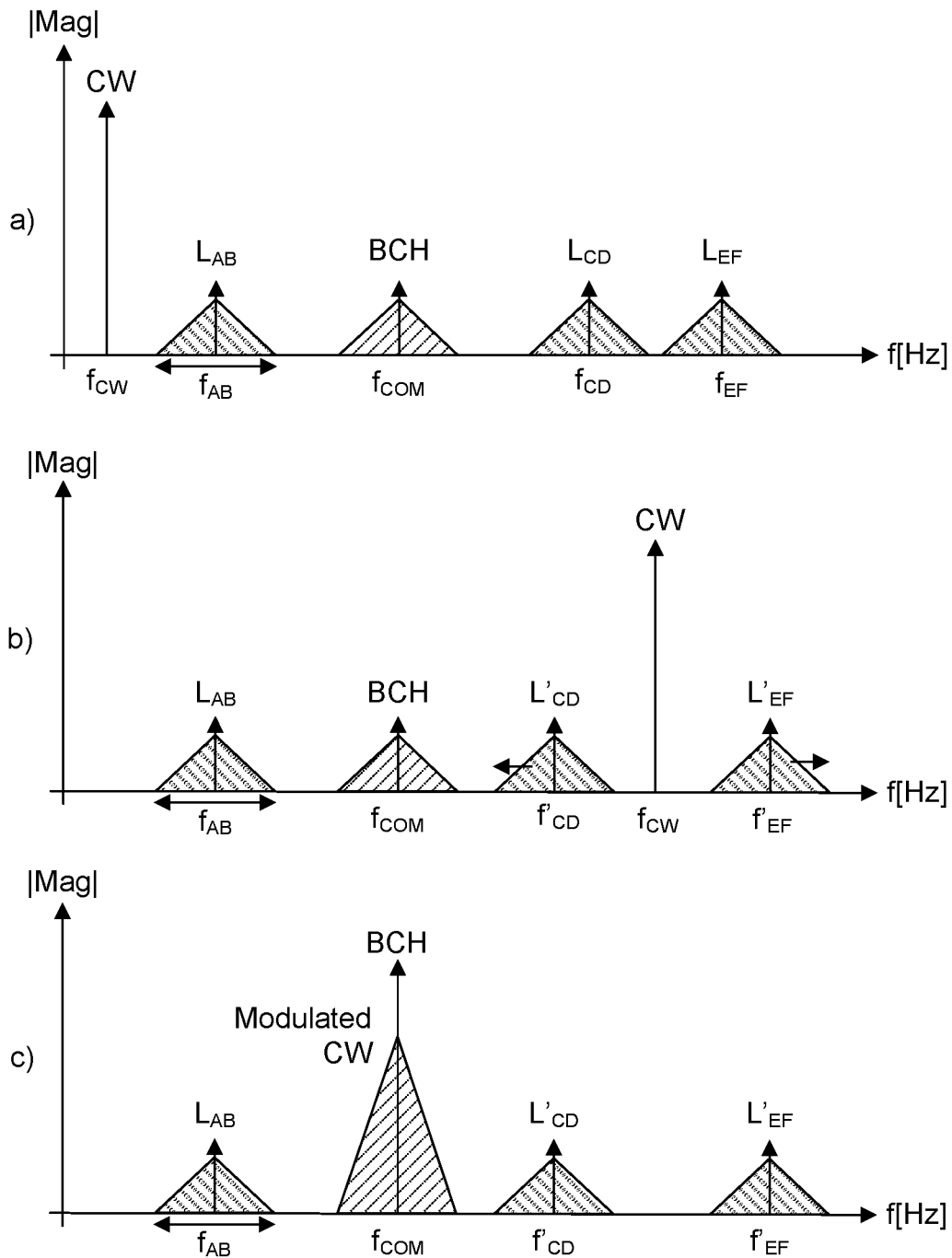
FIG. 22 is a diagram illustrating several possible frequency and magnitude configurations for the power harvesting signal and the various communication channels in accordance with embodiments.

In various embodiments depicted in part c of FIG. 22, the CLH (e.g., WTRU 501) may transmit modulated tones on the BCH for both energy harvesting and communication on the BCH. As needed, cluster devices (e.g., WTRUs 102) harvest energy and/or decode broadcast information from the CLH (e.g., WTRU 501) by adjusting their load terminations. Devices may transmit on the BCH by load modulating the CW energy tone.

Figure 23:
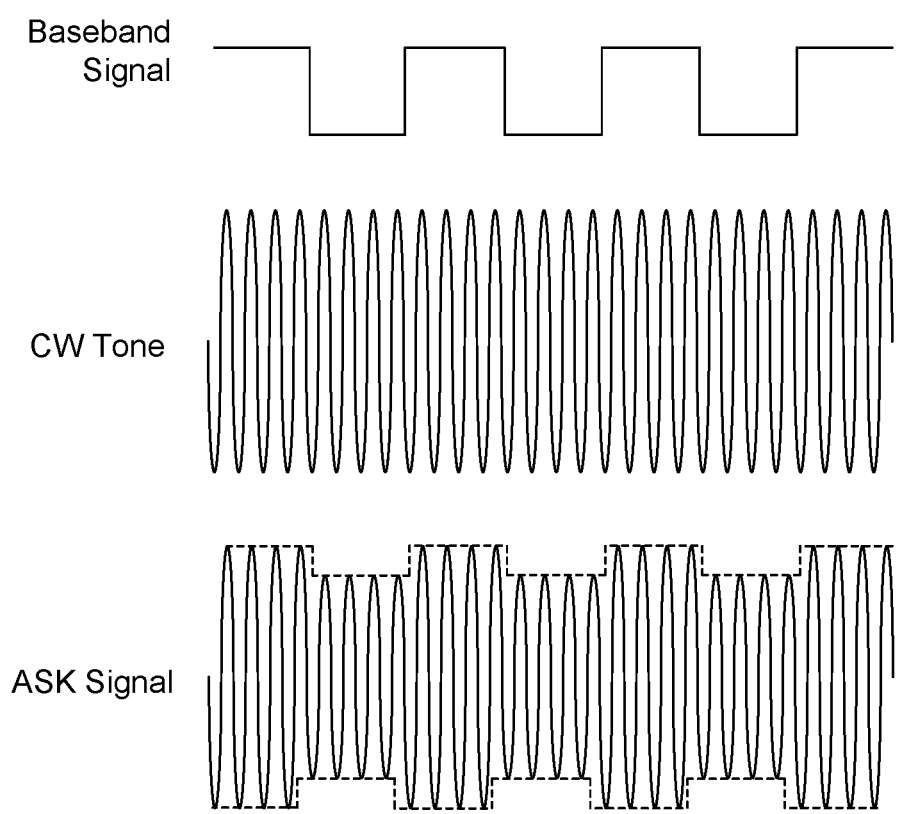
FIG. 23 is diagram illustrating how devices may transmit data on the CW energy tone in the BCH by load modulating the CW energy tone in accordance with one embodiment.

In an embodiment, devices (e.g., WTRUs 102) may transmit on the BCH by load modulating the CW energy tone and, therefore, introduce a changing current that can be decoded by the CLH 102*a*. This concept is depicted in FIG. 23, which shows the baseband data signal at (a) and the CW energy transfer tone at (b). By load modulating the data signal (a) onto the CW tone (b), using, e.g., amplitude shift keying (ASK), the combined signal, as shown at (c) in FIG. 23 may be used both for energy harvesting and data transfer.

Using a low modulation depth, the resulting modulated signal may maintain most of the original CW tone amplitude, while the information or modulation depth may be sufficient for detection by a receiver within RMC range.

In various embodiments, a modulated tone may be placed in a unicast link where both energy and information may be exchanged.

In various embodiments, a modulated tone may be used in a unicast link where both energy and information may be exchanged similar to the above description.

Time Division Multiplexing

When or if the above options are not feasible or practical, a time-multiplexed (TDM) based approach may be used where the EH signal and data may be assigned to specific timeslots, for example, according to a predetermined schedule. For example, in a time-based approach, in a first timeslot, the CLH (e.g., WTRU 501) may transmit its modulated power waveform and, in a second timeslot, turn off its transmitter and/or switch to receive mode. Then, devices (e.g., WTRUs 102) may take turns transmitting on the BCH according to a predetermined schedule.

Figure 27:
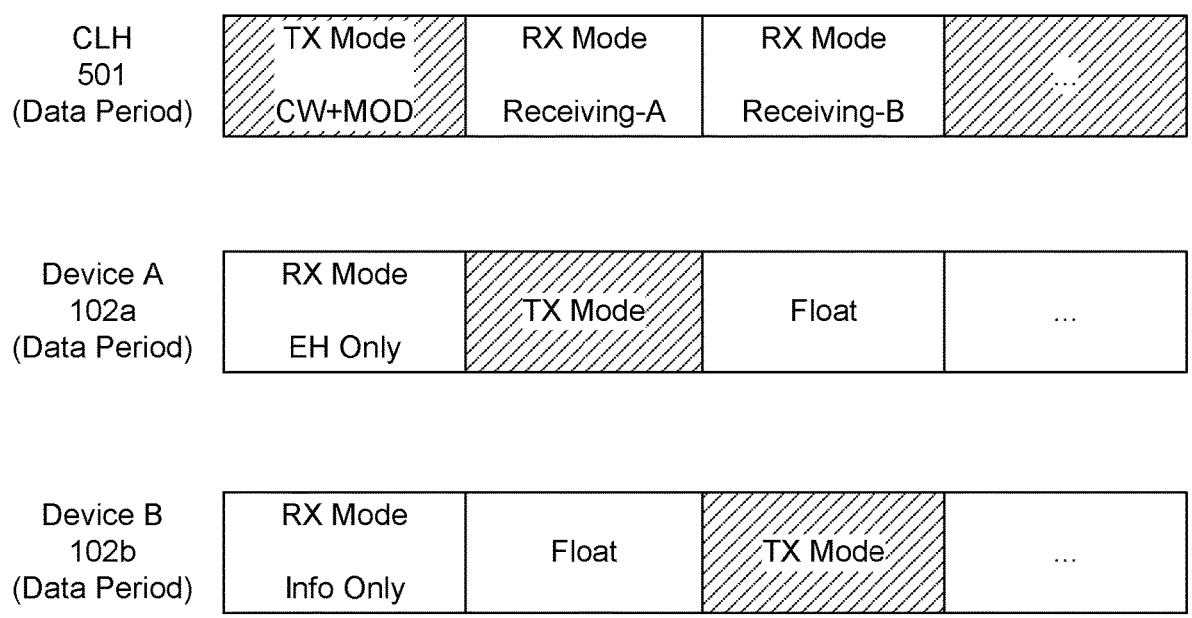
FIG. 27 is a diagram illustrating time division multiplexing of energy transfer and information transfer in accordance with one embodiment.

FIG. 27 illustrate this embodiment by showing the time slot configurations for the CLH (e.g., WTRU 501) and two devices (e.g., WTRUs 102) (device A and device B) that are in communication with the CLH 102a. As shown, during a first time slot, the CLH (e.g., WTRU 501) may be configured to transmit data (e.g., on the BCH), while the devices (e.g., WTRUs 102) may be configured to receive those transmissions. During this time slot, the CLH (e.g., WTRU 501) may transmit the energy harvesting signal (and any of the devices (e.g., WTRUs 102) may use it to harvest energy as needed. In the second time slot, (1) the CLH (e.g., WTRU 501) may turn off the energy harvesting beacon and/or may be configured to receive on the BCH, (2) device A may be configured to transmit during this time slot, and (3) device B may be floating. In the third time slot, (1) the CLH (e.g., WTRU 501) may keep the energy harvesting beacon off and/or may remain configured to receive on the BCH, (2) device B may be configured to transmit during this time slot, and (3) device A may be floating. This cycle may continue to repeat for as long needed (e.g., until another device joins the CLH (e.g., WTRU 501) and/or the schedule may need to be modified to accommodate the third device).

In yet another exemplary embodiment, the CLH (e.g., WTRU 501) may assign time-slots for data transmission for any (e.g., each) device along with associated load-states.

In an even further exemplary embodiment, the CLH (e.g., WTRU 501) may assign time-slots for energy transfer for any (e.g., each) device (e.g., WTRU 102) along with associated load-states.

2.3. CLUSTER MEMBERSHIP AND POWER SAVING STRATEGIES 2.3.1. New Device Coining or Leaving a Cluster A new device (e.g., WTRU 102) detected and authenticated by the CLH (e.g., WTRU 501) after a discovery procedure may request to join the cluster and establish a unicast data link with a current cluster member device (e.g., WTRU 102) for the purpose of exchanging information and/or other resources. Since the CLH (e.g., WTRU 501) has a table/list of supported features and current configuration for any (e.g., each) device (e.g., WTRU 102) in the cluster, it may assist in the selection of a candidate device, with the relevant features or settings to support the unicast link requested by the joining device. The CLH (e.g., WTRU 501) may then assess the loading effect of the potential new link on the existing link's QoS. If the RSSI or CQI reduction impact is below a first threshold, the CLH (e.g., WTRU 501) may grant permission for the new link. If RSSI reduction is above that first threshold, the CLH (e.g., WTRU 501) may grant permission for Load-based Access, if there is a load termination setting supported on the device (e.g., WTRU 102) side that is capable of reducing the performance impact below that first threshold.

If the performance impact remains above the first threshold but below a second threshold, the CLH (e.g., WTRU 501) may instead grant permission for time slot-based load access on the medium. If loading impact is above the second threshold, the CLH (e.g., WTRU 501) may reject the device's request for a new unicast link formation.

From the device (e.g., WTRU 102) perspective, the new device (e.g., WTRU 102) may receive authentication information request from CLH 102a. Then, the device (e.g., WTRU 102) may report (e.g., transmit information indicating) any of: its ID, SNR table, priority level, supported features, etc. to the CLH 102a. The device (e.g., WTRU 102) may move to designated center frequency based on the CLH (e.g., WTRU 501) request and may adjust its coupling coefficient and load termination state based on CLH (e.g., WTRU 501) request. If a time slot-based access is selected by the CLH 102a, the device (e.g., WTRU 102) may switch between load and float-states, for example, according to the assigned time slot schedule from CLH 102a.

For a device (e.g., WTRU 102) wanting to exit its current cluster, the CLH 102a, after (e.g., upon) receiving exit notice from the departing cluster device, may send an ACK and a request for link quality measurements from the remaining device (e.g., WTRU 102) members to assess overall cluster performance. If link quality falls below a pre-determined threshold, the CLH (e.g., WTRU 501) may issuing any number of the following to any number of the remaining devices (e.g., WTRUs 102) in the cluster: Load termination state changes, schedule and time slot updates, and/or frequency adjustments.

2.3.2. Inter-Cluster Operation

In a scenario where two adjacent clusters exist with their respective cluster heads operating on their respective BCHs, the cluster heads (e.g., WTRUs 501) may be aware of the neighboring cluster(s) as a result of a discovery procedure and/or a device (e.g., WTRU 102) reporting (e.g., transmitting information indicating) the presence of an adjacent device (e.g., WTRU 102) belonging to a different cluster.

If the overall cluster performance measured on the BCH falls below a predetermined threshold, the CLH (e.g., WTRU 501) of that cluster may negotiate with an adjacent/offending CLH (e.g., WTRU 501) to adjust to the BCH settings of the CLH (e.g., WTRU 501) of the adjacent/offending cluster. The adjustment may include, for example, a change in the BCH center frequency and/or a change in the load termination state of devices (e.g., WTRUs 102) listening to their own BCH such that the loading on the adjacent BCH is reduced. The adjustment also may comprise one or both of the adjacent/offending CLHs scheduling access to their BCHs during a designated time slot for any (e.g., each) cluster. In an embodiment, a type of DRX may be implemented on the BCH, in which the cluster not currently listening to its BCH may enter a float-state, thus unloading the medium shared with the adjacent cluster.

2.3.3. Discontinuous Reception (DRX) Strategies

Discontinuous reception may be used not (e.g., only) to extend the battery life of the mobile device, but also to periodically decouple the device (e.g., WTRU 102) from the RMC cluster and free-up network resources.

DRX implementations may include any of the following:
  The device (e.g., WTRU 102) and the CLH (e.g., WTRU 501) may negotiate (or the cluster head (e.g., WTRU 501) may simply assign) the periods during which data transfer may occur and/or the DRX periods.
  The device (e.g., WTRU 102) receiver is active (e.g., only) at the beginning of any (e.g., each) relevant time slot in order to determine if data is being transmitted in that time slot intended for that device. If it determines that there is no data in this time slot intended for it, the device (e.g., WTRU 102) may turn its receiver off and/or may enter a low power state.

A polling technique, where the device (e.g., WTRU 102) is placed in standby for a given duration. A beacon may be periodically sent by the CLH (e.g., WTRU 501) to indicate (e.g., transmit information indicating) when there is data waiting for any of the devices (e.g., WTRUs 102) within a configured DRX period, as well as CLH intention to schedule those devices (e.g., WTRUs 102) for data reception.

A hybrid method comprising a combination of the above techniques.

In one example, a device (e.g., WTRU 102) may receive any of: a scheduling table, time slot assignment, and/or load termination state setting for any (e.g., each) time slot from the cluster head (e.g., WTRU 501). The device (e.g., WTRU 102) may then transmit according to its assigned transmission time slots. The device (e.g., WTRU 102) may periodically switch from power saving mode or float-state to load termination state according to a CLH (e.g., WTRU 501) assigned receive time slot or schedule.

In an embodiment, devices (e.g., WTRUs 102) belonging to a cluster but not actively part of a data communication link, still may be used by the cluster head (e.g., WTRU 501) to help improve RMC link quality for currently connected device-pairs.

In an embodiment, the CLH (e.g., WTRU 501) may determine that its cluster performance is sub-optimal or recognize a need to improve existing link performance. Knowing the device (e.g., WTRU 102) capabilities and/or SNR tables of all cluster members, in such a case, the CLH (e.g., WTRU 501) may instruct those cluster members that are not currently in a unicast or multicast link (e.g., devices (e.g., WTRUs 102) that have relinquished the resonance magnetic medium, but periodically access it to receive control information on the broadcast channel). CLH 102*a*, requesting a change in the device (e.g., WTRU 102) load termination state to modify channel and/or link characteristics such as any of:

Common channel center frequency to optimize the BCH;
Location of resonant peaks to optimize current device-pairs links qualities; and/or
Coupling efficiency between existing links.

Device Mobility

The non-transmitting device (e.g., WTRU 102) also may be subject to mobility within the cluster, which may affect other device-pair links. The cluster head (e.g., WTRU 501) may implement periodic control procedures to assess the continued usefulness of the device (e.g., WTRU 102) in helping with overall cluster performance and/or mitigate potential negative impact introduced by the change in the device (e.g., WTRU 102) location.

For example, devices (e.g., WTRUs 102) may continuously report (e.g., transmit information indicating) changes in link quality to the CLH (e.g., WTRU 501) on the BCH and receive re-balancing instructions from the CLH 102*a*. The CLH (e.g., WTRU 501) may request non-transmitting devices (e.g., WTRUs 102) to move to float-state so that the CLH (e.g., WTRU 501) can measure that device's impact on cluster performance. If the device (e.g., WTRU 102) is having a sufficiently detrimental effect on cluster performance, the CLH (e.g., WTRU 501) may request that non-transmitting device (e.g., WTRU 102) to switch to a new load termination state for designated time slots.

2.4. EXEMPLARY EMBODIMENTS 2.4.1. Exemplary Embodiment 1

Figure 24:
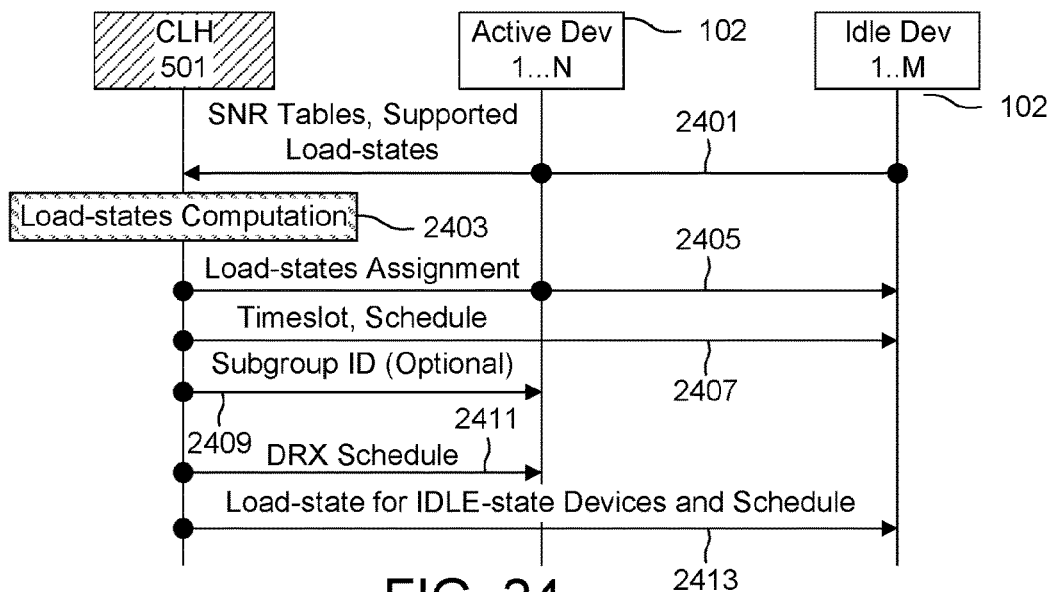
FIG. 24 is a signal flow diagram illustrating a method performed by a cluster head to maximize the number of devices able to communicate on the Broadcast Channel and allocate resources based on need in accordance with one embodiment.

FIG. 24 is a signal flow diagram illustrating an exemplary method performed by a CLH (e.g., WTRU 501) to maximize the number of devices (e.g., WTRUs 102) able to communicate on the BCH and/or allocate resources based on need by leveraging the load termination state of devices (e.g., WTRUs 102) within its range. The method may comprise a CLH (e.g., WTRU 501) receiving measurement reports (e.g. channel quality/SNR tables), device (e.g., WTRU 102) capabilities (e.g. supported load termination states) from all devices (e.g., WTRUs 102) in range (within the served cluster), with all devices (e.g., WTRUs 102) configured with their default load termination state value (2401). Using the received measurement reports and/or device (e.g., WTRU 102) capabilities, the CLH (e.g., WTRU 501) may assign any (e.g., each) device (e.g., WTRU 102) to one of N sub-groups (2403). The CLH (e.g., WTRU 501) also may assign load termination states for any (e.g., each) device (e.g., WTRU 102) based on their respective group assignment to use in receive mode (or listening on BCH) (2405).

For example, the CLH (e.g., WTRU 501) may assign load termination states for any (e.g., each) device (e.g., WTRU 102) based on its respective group assignment to use during transmit cycle on BCH, where device (e.g., WTRU 102) TX load termination state may provide better match or termination to the RMC channel resulting in stronger RSSI at the CLH (e.g., WTRU 501) receiver. Assigned RX load termination state settings may be different from assigned TX load termination state, e.g., RX load termination may be set to a sub-optimal value of 75 or 100 Ohms in order to receive a signal slightly above a minimum SNR, whereas TX load may be set to 50 Ohms (in a 50 Ohm system) to provide an optimal match and/or better efficiency during the device (e.g., WTRU 102) transmit cycle on the RMC channel. Other TX/RX load termination pairs may include, for example, the following (Tx, Rx) couples: (75,50), (100, 100), (50,50), (75, 100), etc. For a device (e.g., WTRU 102) listening for broadcast information from the CLH 102*a*, its receiver load termination state may be set to a pre-assigned RX termination value. When transmitting on BCH, for example, during a random access cycle (RACH), or a form of carrier-sense multiple access with collision avoidance (CSMA/CA) scheme, the device (e.g., WTRU 102) load termination state may be changed to a pre-assigned TX load termination (e.g., $Z_1=25$, $Z_2=50$, $Z_3=75$ or $Z_i=100$ Ohms).

In addition, the CLH (e.g., WTRU 501) may utilize measurement reports to determine a set of edge devices (e.g., WTRUs 102) and/or assign them to a single group. The CLH (e.g., WTRU 501) also may schedule measurement occasions for combinations of device (e.g., WTRU 102) sub-groups (transmitting versus receiving) within the identified group of edge users over combinations of time, frequency, and/or load termination states. The CLH (e.g., WTRU 501) also may determine any (e.g., each) device's SNR curves versus frequency per load termination state and device (e.g., WTRU 102) sub-group configuration. The CLH (e.g., WTRU 501) also may determine/calculate load termination state for any (e.g., each) device (e.g., WTRU 102) based on measured/determined SNR/RSSI curves and expected/planned BCH scheduling configuration.

Next, the CLH (e.g., WTRU 501) may assign time slots for transmission for any (e.g., each) device (e.g., WTRU 102) with associated load termination states and broadcast a schedule to all cluster devices (e.g., WTRUs 102) with designated time slot and/or transmission periods (2407). Time slot usage may be proportionately divided amongst users based on priority and/or data rate requirements.

Additionally, the CLH (e.g., WTRU 501) may create subgroups of devices (e.g., WTRUs 102) within its cluster, where devices (e.g., WTRUs 102) may be assigned to a subgroup based on either SNR/RSSI, priority level, supported features, etc. (2409).

Furthermore, the CLH (e.g., WTRU 501) may assign DRX periods to any (e.g., each) subgroup, where any (e.g., each) subgroup will take turn listening to the BCH according to its assigned DRX period (2411).

Yet further, the CLH (e.g., WTRU 501) may request devices (e.g., WTRUs 102) currently not communicating on the BCH and/or devices (e.g., WTRUs 102) that have relinquished the medium to change load termination state to help shape the channel response, e.g., channel quality factor (Q), in order to optimize/maximize the channel usage and/or bandwidth (2413). After (e.g., when) cluster conditions have changed, the CLH (e.g., WTRU 501) may request a device (e.g., WTRU 102) to exit this facilitator-mode by relinquishing the medium and, for example, reverting to a power saving mode or a sleep-mode, etc.

In an embodiment, no sub-groups are created by the CLH 102*a*. Rather, (e.g., only) the leveraging of individual device (e.g., WTRU 102) load termination states may be used. A CLH (e.g., WTRU 501) may receive frequency versus SNR curves and supported load termination states from all devices (e.g., WTRUs 102) in range, with all devices (e.g., WTRUs 102) configured with their default load termination state value. The CLH (e.g., WTRU 501) may determine/calculate load termination state for any (e.g., each) device (e.g., WTRU 102) based on reported SNR/RSSI. The CLH (e.g., WTRU 501) may assign load termination states for any (e.g., each) device (e.g., WTRU 102) to use in receive mode (or listening on BCH). The CLH (e.g., WTRU 501) may assign load termination states for any (e.g., each) device (e.g., WTRU 102) to use during transmit cycle on BCH, where device (e.g., WTRU 102) TX load termination state may provide better match or termination to the RMC channel resulting in stronger RSSI at the CLH (e.g., WTRU 501) receiver. Assigned RX load termination state settings may be different from assigned TX load termination state, e.g., RX load termination may be set to a sub-optimal value of 75 or 100 Ohms, in order to receive a signal slightly above a minimum SNR, whereas TX load maybe set to 50 Ohms (in a 50 Ohm system) to provide an optimal match and/or better efficiency during the device (e.g., WTRU 102) transmit cycle on the RMC channel. Other TX/RX load termination pairs may include, for example, the following (Tx, Rx) couples: (75,50), (100, 100), (50,50), (75, 100), etc.

For a device (e.g., WTRU 102) listening for broadcast information from the CLH 102*a*, its receiver load termination state may be set to a pre-assigned RX termination value. When transmitting on BCH, for example, during a random access cycle (RACH), or a form of carrier-sense multiple access with collision avoidance (CSMA/CA) scheme, the device (e.g., WTRU 102) load termination state may be changed to a pre-assigned TX load termination (e.g., Z1=25, Z2=50, Z3=75 or Zi=100 Ohms).

In an embodiment, a sub-group comprising (e.g., consisting of) cell edge devices (e.g., WTRUs 102) with SNR reported (marginally) above a first threshold but below a second threshold, may be created by the CLH (e.g., WTRU 501) to leverage the sub-group device (e.g., WTRU 102) load termination state, while keeping overall cluster management overhead to a reasonable or acceptable level. In an embodiment, the cluster head (e.g., WTRU 501) may receive any of: measurement reports (e.g. channel quality/SNR tables), device (e.g., WTRU 102) capabilities (e.g. supported load termination states) from all devices (e.g., WTRUs 102) in range (within the served cluster), with all devices (e.g., WTRUs 102) configured with their default load termination state value.

Using the received measurement reports and/or device (e.g., WTRU 102) capabilities, the CLH (e.g., WTRU 501) may assign any (e.g., each) device (e.g., WTRU 102) to one of 2 groups, namely, a group for devices (e.g., WTRUs 102) reporting (e.g., transmitting information indicating) a SNR level below a pre-determined threshold and/or a general group for all other devices (e.g., WTRUs 102).

The CLH (e.g., WTRU 501) also may assign load termination states for any (e.g., each) device (e.g., WTRU 102) based on their respective group assignment to use in receive mode (or listening on BCH). General group load termination states may be assigned for relatively long durations, e.g., n cycles where n>>$m_{slots}$, with $m_{slots}$=number of time slots. Edge device (e.g., WTRU 102) group load termination states may be assigned periodically with high frequency, e.g., device (e.g., WTRU 102) load termination states are updated at a much higher rate than the general group device (e.g., WTRU 102) load termination states.

The CLH (e.g., WTRU 501) may assign load termination states for any (e.g., each) device (e.g., WTRU 102) to use during transmit cycle on BCH, where device (e.g., WTRU 102) TX load termination state may provide better match or termination to the RMC channel resulting in stronger RSSI at the CLH (e.g., WTRU 501) receiver. Assigned RX load termination state settings maybe different from assigned TX load termination state, e.g., RX load termination maybe set to a sub-optimal value of 75 or 100 Ohms, in order to receive a signal slightly above a minimum SNR, whereas TX load maybe set to 50 Ohms (in a 50 Ohms system) to provide an optimal match and/or better efficiency during the device (e.g., WTRU 102) transmit cycle on the RMC channel. Other TX/RX load termination pairs may include, for example, the following (Tx, Rx) couples: (75,50), (100, 100), (50,50), (75, 100), etc.

For a device (e.g., WTRU 102) listening for broadcast information from the CLH 102*a*, its receiver load termination state may be set to a pre-assigned RX termination value. When transmitting on BCH, for example, during a random access cycle (RACH), or a form of carrier-sense multiple access with collision avoidance (CSMA/CA) scheme, the device (e.g., WTRU 102) load termination state may be changed to a pre-assigned TX load termination (e.g., Z1=25, Z2=50, Z3=75 or Zi=100 Ohms).

2.4.2. Exemplary Embodiment 2

Figure 25:
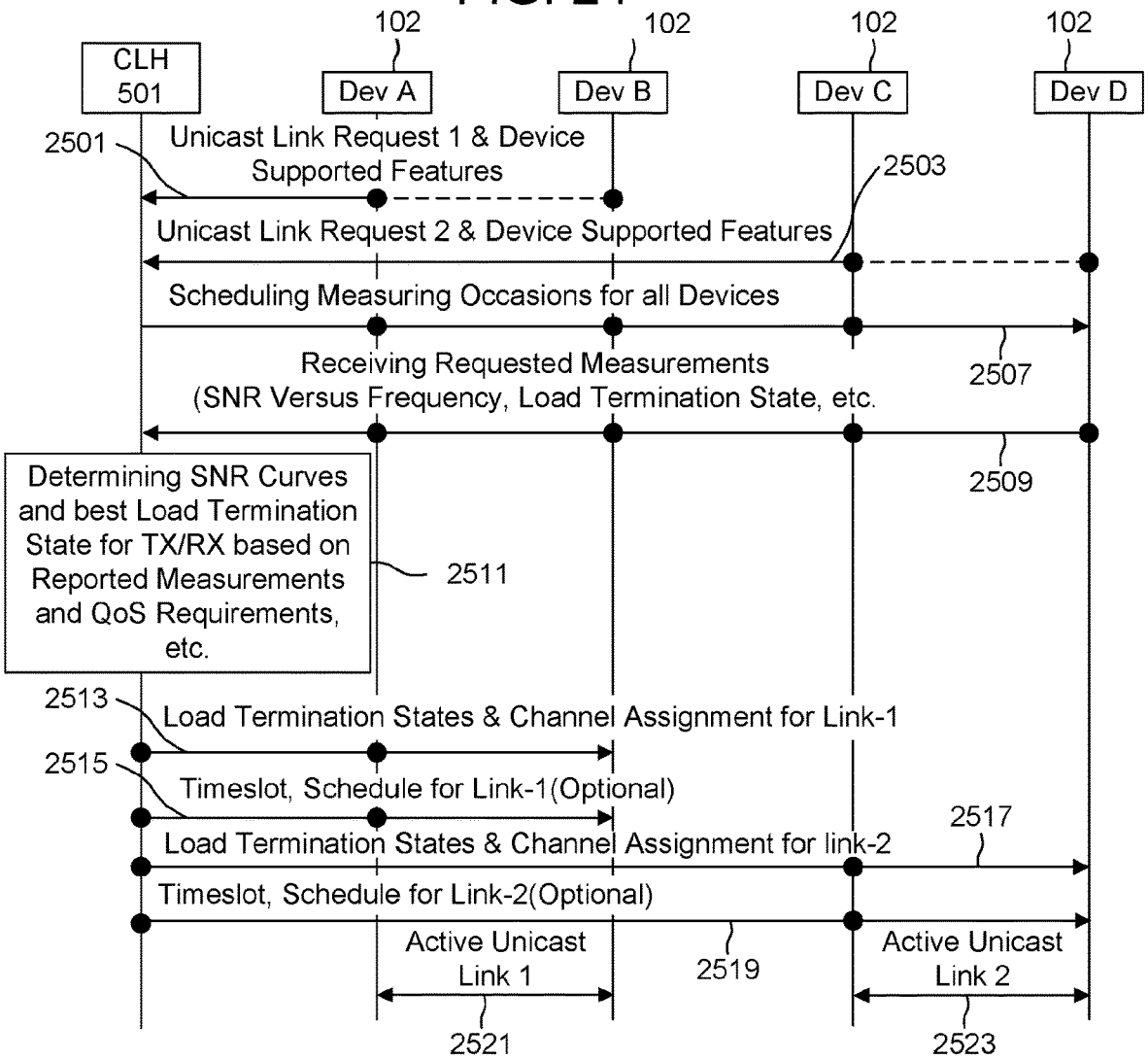
FIG. 25 is a signal flow diagram illustrating a method performed by a cluster head for managing device-pairs connected via unicast links and allocating medium resources (bandwidth, time slots) in accordance with one embodiment.

FIG. 25 is a signal flow diagram illustrating an exemplary method performed by a cluster head (e.g., WTRU 501) managing device-pairs connected via unicast links and/or allocating medium resources (bandwidth, time slots) and/or minimizing interference between adjacent links by using the load termination state of devices (e.g., WTRUs 102) during transmission and/or reception cycles. The method may comprise a CLH (e.g., WTRU 501) receiving supported load termination states, e.g. capabilities, from all devices (e.g., WTRUs 102) in range (within the served cluster), with all devices (e.g., WTRUs 102) configured with their default load termination state value.

The CLH (e.g., WTRU 501) may receive any of link establishment requests, scheduling control information (e.g.

quality of service, buffer status, . . . etc.), and/or capabilities (e.g., 2501, 2503) in a control period preceding the data scheduling period from the devices (e.g., WTRUs 102) wishing to establish a RMC link with each other (e.g., devices (e.g., WTRUs 102) A and B and devices (e.g., WTRUs 102) C and D).

The CLH (e.g., WTRU 501) may determine scheduling measurement occasions for devices (e.g., WTRUs 102) that are part of the link establishment requests over a combination of time, frequency, and/or load termination states and/or transmits the measurement occasions schedule to all such devices (e.g., WTRUs 102) (2507). At 2509, the CLH (e.g., WTRU 501) may receive the requested measurements, such as SNR as a function of frequency, load termination state, etc. Based on those measurements and/or any other relevant factors (e.g., QoS requirements, buffer statuses, etc.), the CLH (e.g., WTRU 501) may determine any (e.g., each) device's SNR curve and/or a best load termination state for any (e.g., each) of transmitting and/or receiving for any (e.g., each) such device (e.g., WTRU 102) (2511). The CLH (e.g., WTRU 501) may transmit the assigned load termination states and/or channel assignments for any (e.g., each) link to the individual devices (e.g., WTRUs 102) (e.g., 2513, 2517). It may assign and/or transmit a time slot schedule for any (e.g., each) link (e.g., 2515, 2519). Thereafter the devices (e.g., WTRUs 102) may begin communicating over the RMC links (e.g., 2521, 2523).

In an embodiment, the measurement occasions may be scheduled every control/data scheduling period, preceding the data transfer period, but following the control period.

In an embodiment, the measurement occasions may be periodic with a period that may span a plurality of (e.g., multiple) control/data scheduling periods and/or may further comprise the CLH 102a:
  scheduling measurement occasions at the beginning of the measurement period for combinations of device (e.g., WTRU 102) groups, time, frequency, and/or load termination states;
  determining any (e.g., each) device's SNR curves vs frequency per load termination state and/or device (e.g., WTRU 102) group configuration;
  receiving link establishment requests, scheduling control information, and/or capabilities in a control period preceding every data transfer period within the measurement period; and/or
  determining/calculating load termination state for any (e.g., each) device (e.g., WTRU 102) based on measured/determined SNR/RSSI curves, link establishment requests in a current control/data transfer period, QoS requirements, and/or buffer status.

The CLH (e.g., WTRU 501) may assign time periods for TX/RX cycles for any (e.g., each) device-pair, where both devices (e.g., WTRUs 102) forming a unicast link can complete a transmit-receive cycle before entering a DTX/DRX load termination state, e.g., a Float-State, while other device-pairs may enter their respective transmit cycles.

The unicast link Tx/Rx period may be proportionately allocated amongst users based on priority and/or data rate requirements.

From the device (e.g., WTRU 102) perspective, the method may comprise a device (e.g., WTRU 102) performing any number of the following actions:
  The device (e.g., WTRU 102) requesting access to, or formation of a unicast link for the purpose of exchanging information;
  The device (e.g., WTRU 102) sending a candidate device (e.g., WTRU 102) ID for the unicast link formation or may be assigned a device (e.g., WTRU 102) by the CLH 102a;
  The device (e.g., WTRU 102) receiving load termination values for transmit and/or receive cycles from CLH 102a
    The assigned transmit load termination state may be different from the receive load termination state; and/or
  The device (e.g., WTRU 102) communicating with the assigned device (e.g., WTRU 102) on assigned unicast link using assigned TX load termination state during transmit cycles and switching to assigned receive load termination state during RX cycles.

In addition, the device (e.g., WTRU 102) may receive time period assignments for TX/RX cycles, where both devices (e.g., WTRUs 102) forming a unicast link can complete a transmit-receive cycle before entering a DTX/DRX load termination state, e.g., a Float-State, while other device-pairs may start their respective transmit cycles A unicast link TX/RX period may be proportionately allocated amongst users based on priority and/or data rate requirements.

A device (e.g., WTRU 102) may enter an assigned DTX/DRX load termination state after completing TX/RX cycles.

A device (e.g., WTRU 102) may exit DRX/DTX float-state after a pre-allocated time period and/or resume normal TX/RX cycles on the unicast link.

2.4.3. Exemplary Embodiment 3

Figure 26:
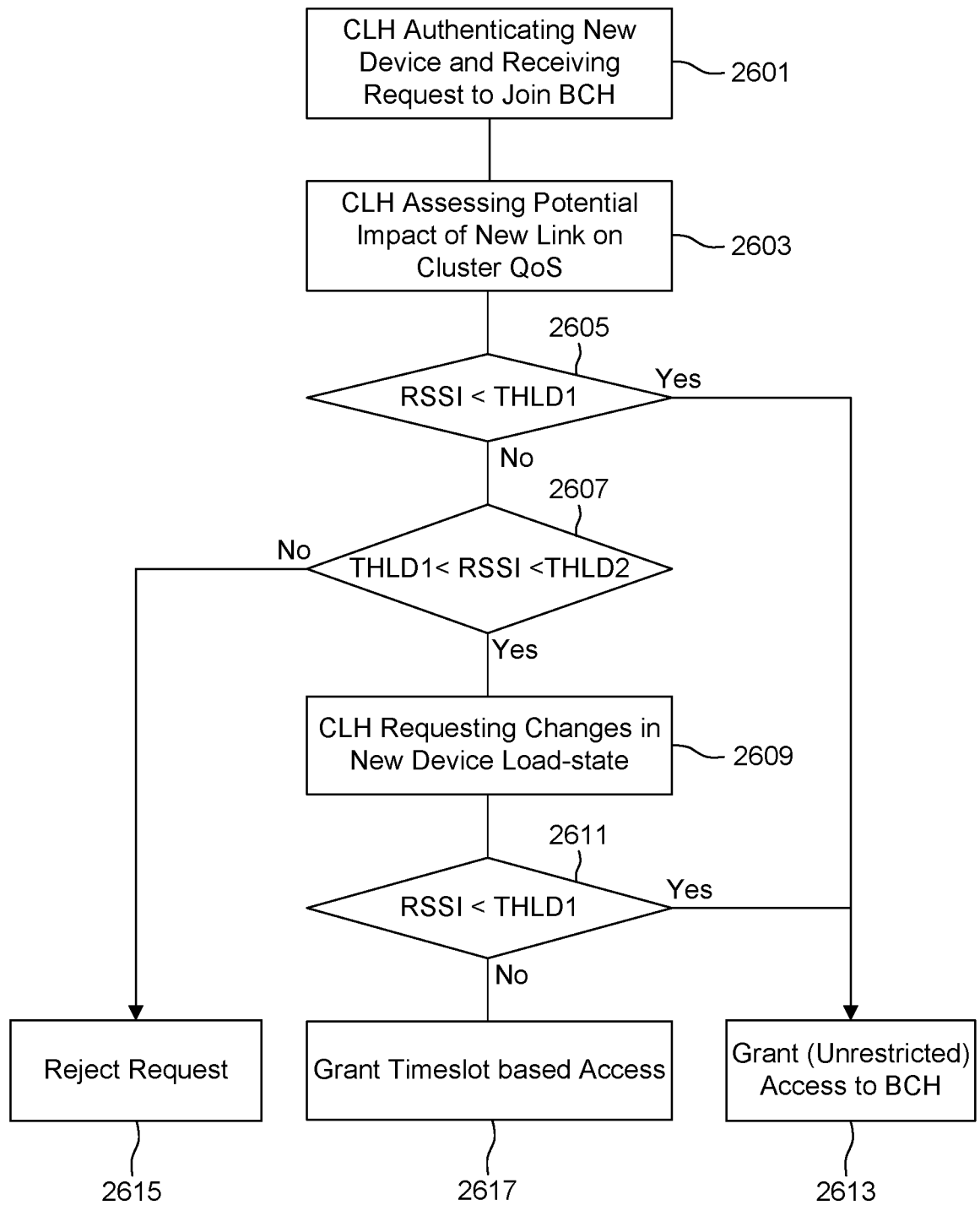
FIG. 26 is a flowchart illustrating an exemplary method performed by a cluster head (CLH) to manage a new device joining the cluster.

FIG. 26 is a flowchart illustrating an exemplary method performed by a CLH (e.g., WTRU 501) to manage a new device (e.g., WTRU 102) joining the cluster.

After (e.g., when) a new device (e.g., WTRU 102) joins a cluster, after a discovery procedure in which the cluster head (e.g., WTRU 501) establishes a communication link with the new device (e.g., WTRU 102) (not shown), the cluster head (e.g., WTRU 501) may authenticate the new device (e.g., WTRU 102) configured with its default load termination state value and/or may receive a request from new device (e.g., WTRU 102) to join the BCH (2601). In response, the CLH (e.g., WTRU 501) may assess loading effect of potential new link on existing BCH links QoS (2603). At 2605, the CLH (e.g., WTRU 501) may determine if RSSI reduction (ΔRSSI) is below a first threshold. If so, the CLH (e.g., WTRU 501) may grant permission for new link (2613). If not, flow may proceed to step 2607 where the CLH (e.g., WTRU 501) may determine if RSSI reduction is between a first and a second threshold. If, loading impact is above the second threshold, the CLH (e.g., WTRU 501) may reject new link request and/or the device (e.g., WTRU 102) may be requested to switch to FLOAT state (2615).

If, on the other hand, the load impact is determined in step 2607 to be between the first and second thresholds, the CLH (e.g., WTRU 501) may request the new device (e.g., WTRU 102) to change its load termination state as deemed desirable (2609) and/or may check if the new load setting causes the load impact to drop below the first threshold (2611). If so, the CLH (e.g., WTRU 501) may grant permission for load-based access (2613). If, on the other hand, the new load setting does not reduce the load impact below the first threshold, the CLH (e.g., WTRU 501) may grant permission for time slot-based load access (2617).

Newly admitted devices (e.g., WTRUs 102) in the cluster, that are not currently communicating on BCH or a unicast link, may be configured as a facilitator and/or help shape and/or improve the channel response for other links, for example, by setting its termination load to a pre-assigned value.

From the device (e.g., WTRU 102) perspective, a new device (e.g., WTRU 102) may receive an authentication info request from the CLH (e.g., WTRU 501) and/or may send its settings and supported features (e.g., ID, SNR table, priority level, load termination states) to the CLH 102a. The device (e.g., WTRU 102) may move to the designated center frequency on CLH (e.g., WTRU 501) request, may adjust its coupling coefficient and/or load termination state upon CLH (e.g., WTRU 501) request and/or may switch to float-state according to time slot schedule from CLH (e.g., WTRU 501) (optional).

After (e.g., when) a device (e.g., WTRU 102) exits a cluster, the CLH (e.g., WTRU 501) may receive an exit notice from the cluster device (e.g., WTRU 102) and/or may send an ACK to the device. The CLH (e.g., WTRU 501) may request and/or receive link quality data from the remaining cluster members, for example, in order to assess cluster performance on the BCH. The CLH (e.g., WTRU 501) may issue any number of: load termination state changes; schedule and/or time slot updates; frequency setting adjustments; and/or coupling coefficient modifications.

Figure 28:
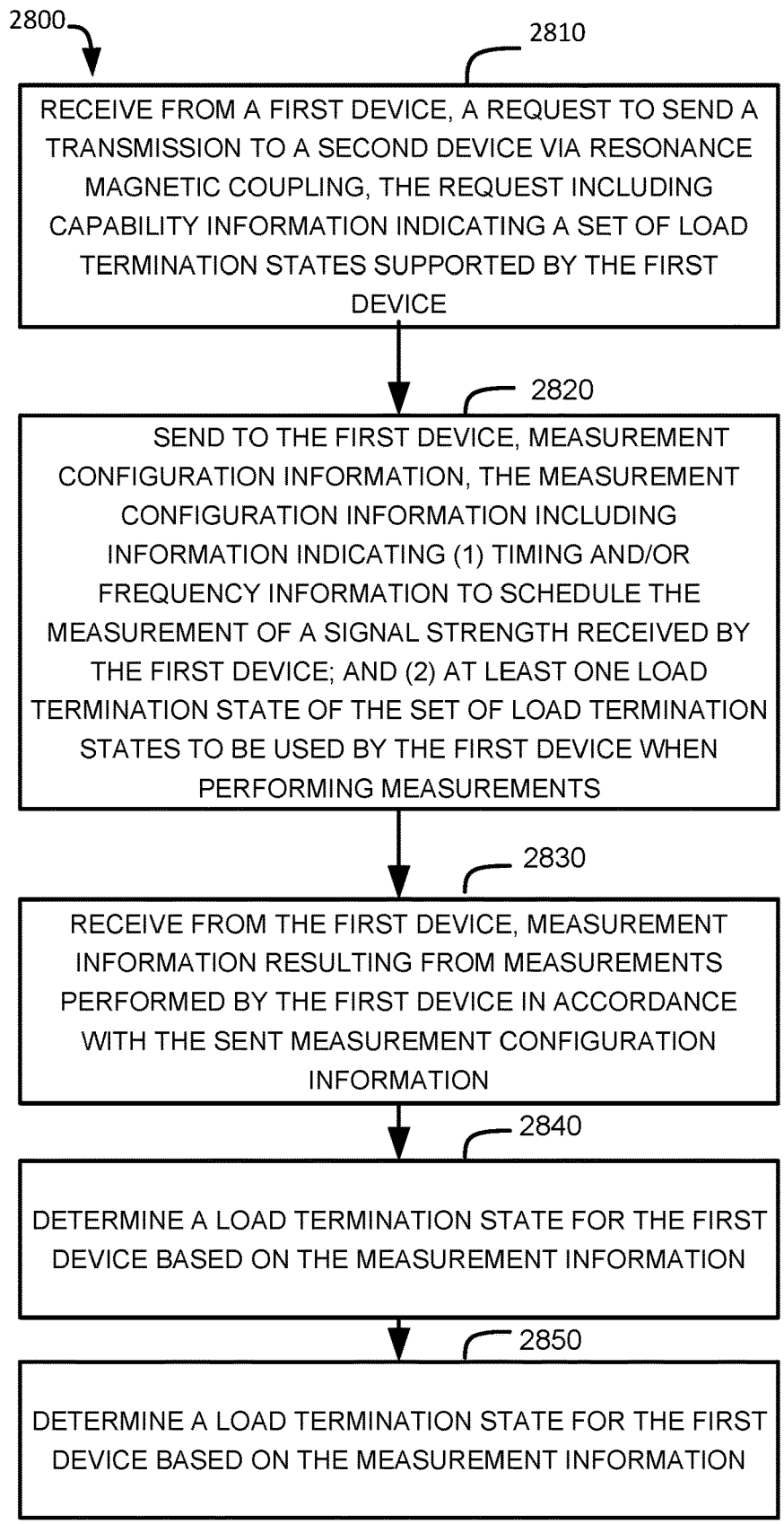
FIG. 28 is a flowchart illustrating a representative method implemented by a WTRU.

FIG. 28 is a flowchart illustrating a representative method implemented by a WTRU.

Referring to FIG. 28, the representative method 2800 may include, at block 2810, receiving from a first device (e.g., WTRU 102a), a request to send a transmission to a second device (e.g., WTRU 102b) via resonance magnetic coupling, the request including capability information indicating a set of load termination states supported by the first device. At block 2820, the WTRU 501 may send to the first device (e.g., WTRU 102a), measurement configuration information, the measurement configuration information including information indicating (1) timing and/or frequency information to schedule the measurement of a signal strength received by the first device (e.g., WTRU 102a); and/or (2) at least one load termination state of the set of load termination states to be used by the first device (e.g., WTRU 102a) when performing measurements. At block 2830, the WTRU 501 may receive from the first device, measurement information resulting from measurements performed by the first device (e.g., WTRU 102a) in accordance with the sent measurement configuration information. At block 2840, the WTRU 501 may determine a load termination state for the first device (e.g., WTRU 102a) based on the measurement information. At block 2850, the WTRU 501 may send to the first device, information indicating the determined load termination state for the first device.

In certain representative embodiments, the load termination state may be determined per time slot and/or frequency assignments for use by the first device (e.g., WTRU 102a).

In certain representative embodiments, the first device (e.g., WTRU 102a), information indicating time slot and/or frequency assignments for use by the first device (e.g., WTRU 102a).

In certain representative embodiments, the WTRU 501 may send to the first device (e.g., WTRU 102a), information indicating an operation mode corresponding to any of a transmit mode, a receive mode, or facilitate mode and/or corresponding load termination state.

In certain representative embodiments, the load termination state may be determined among the set of load termination states indicated by the capability information.

In certain representative embodiments, the measurement information includes information indicating any of: signal to noise ratio (SNR) and/or reported signal strength (RSS).

In certain representative embodiments, the received request includes information indicating any of: a requested Quality of Service (QoS), a priority indicator, an indicator of a required level of reliability of communications, a buffer status indicative of an amount of data to be communicated via the requested transmission, a channel quality metric, and/or capability information indicative of coupling coefficients supported by the first device (e.g., WTRU 102a); and/or wherein the WTRU may determine a load termination state for the first device (e.g., WTRU 102a) may be based on at least the information included in the received request.

In certain representative embodiments, the WTRU 501 may be a cluster head (e.g., WTRU 501) WTRU, and/or the second device (e.g., WTRU 102b) may be managed by the cluster head WTRU 501.

In certain representative embodiments, the WTRU 501 may determine a load termination state for the second device (e.g., WTRU 102b) based on the measurement information; and/or may send to the second device (e.g., WTRU 102b), information indicating the determined load termination state for the second device (e.g., WTRU 102b).

In certain representative embodiments, the WTRU 501 may receive from the first device (e.g., WTRU 102a), a request to send a transmission to a second device (e.g., WTRU 102b) via resonance magnetic coupling, the request including capability information indicating a set of load termination states supported by the first device, and/or the second device. At block 2820, the WTRU 501 may send to the first device (e.g., WTRU 102a) and/or the second device (e.g., WTRU 102b), measurement configuration information, the measurement configuration information including information indicating (1) timing and/or frequency information to schedule the measurement of a signal strength received by the first device (e.g., WTRU 102a) and/or the second device (e.g., WTRU 102b); and/or (2) at least one load termination state of the set of load termination states to be used by the first device (e.g., WTRU 102a) and/or the second device (e.g., WTRU 102b), when performing measurements. At block 2830, the WTRU 501 may receive from the first device and/or the second device (e.g., WTRU 102b), measurement information resulting from measurements performed by the first device (e.g., WTRU 102a) and/or the second device (e.g., WTRU 102b) in accordance with the sent measurement configuration information. At block 2840, the WTRU 501 may determine a load termination state for the first device (e.g., WTRU 102a) and/or the second device (e.g., WTRU 102b) based on the measurement information. At block 2850, the WTRU 501 may send to the first device and/or the second device (e.g., WTRU 102b), information indicating the determined load termination state for the first device.

Figure 29:
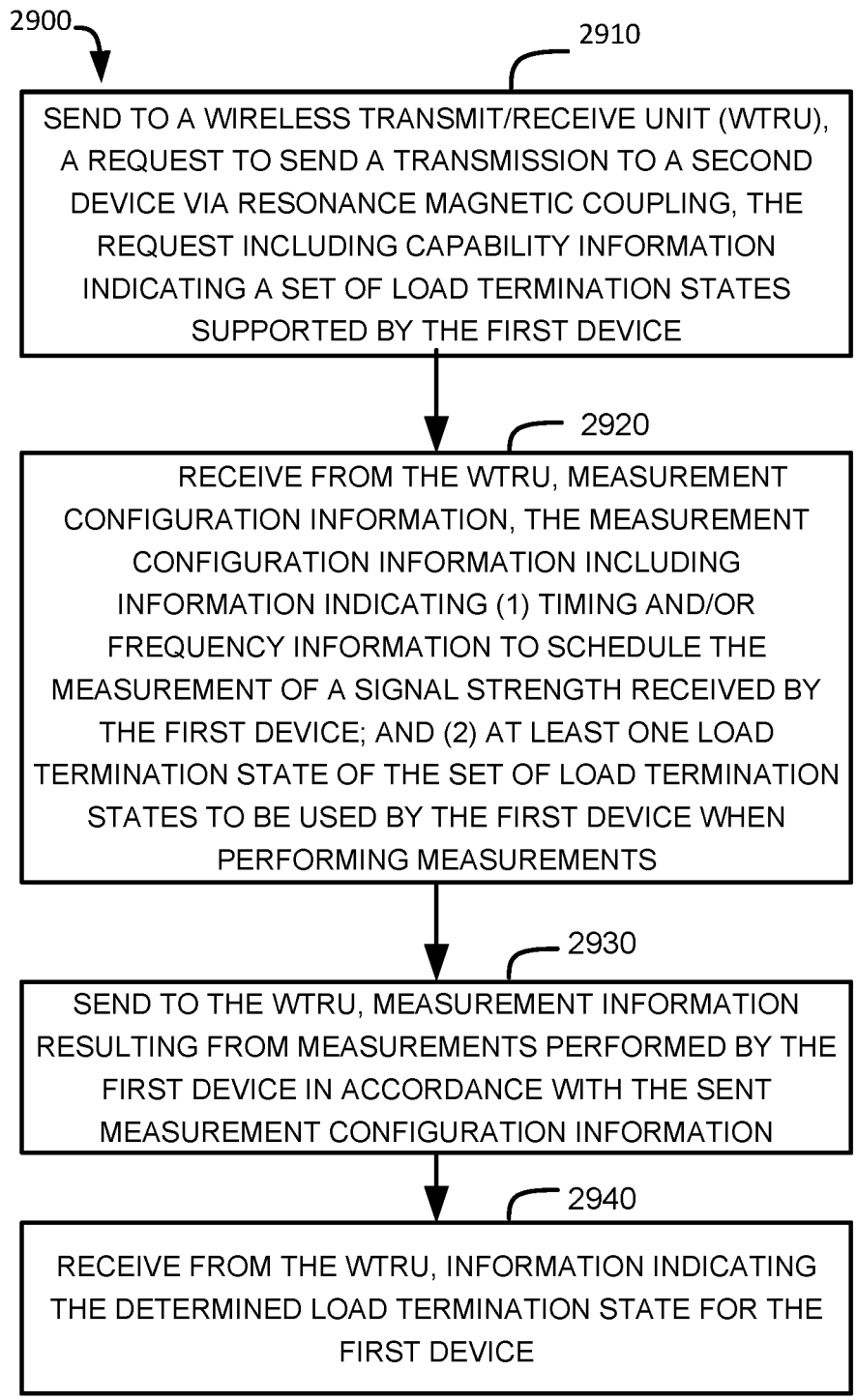
FIG. 29 is a flowchart illustrating a representative method implemented by a first device.

FIG. 29 is a flowchart illustrating a representative method implemented by a first device (e.g., WTRU 102a).

Referring to FIG. 29, the representative method 2900 may include, at block 2910, sending to a WTRU 501, a request to send a transmission to a second device (e.g., WTRU 102b) via resonance magnetic coupling, the request including capability information indicating a set of load termination states supported by the first device (e.g., WTRU 102a). At block 2920, the device may receive from the WTRU 501, measurement configuration information, the measurement configuration information including information indicating (1) timing and/or frequency information to schedule the measurement of a signal strength received by the first device (e.g., WTRU 102a); and/or (2) at least one load termination state of the set of load termination states to be used by the first device (e.g., WTRU 102a) when performing measurements. At block 2930, the device may send to the WTRU 501, measurement information resulting from measurements performed by the first device (e.g., WTRU 102a) in accordance with the received measurement configuration information. At block 2940, the device may receive from the WTRU 501, information indicating a determined load termination state for the first device (e.g., WTRU 102a).

In certain representative embodiments, the load termination state may be determined per time slot and/or frequency assignments for use by the first device (e.g., WTRU 102a).

In certain representative embodiments, the device may receive from the WTRU 501, information indicating time slot and/or frequency assignments for use by the first device (e.g., WTRU 102a).

In certain representative embodiments, the device may receive from the WTRU 501, information indicating an operation mode corresponding to any of a transmit mode, a receive mode, or facilitate mode and/or corresponding load termination state.

In certain representative embodiments, the load termination state may be determined among the set of load termination states indicated by the capability information.

In certain representative embodiments, the measurement information includes information indicating any of: signal to noise ratio (SNR) and/or reported signal strength (RSS).

In certain representative embodiments, the receive request includes information indicating any of: a requested Quality of Service (QoS), a priority indicator, an indicator of a required level of reliability of communications, a buffer status indicative of an amount of data to be communicated via the requested transmission, a channel quality metric, and/or capability information indicative of coupling coefficients supported by the first device (e.g., WTRU 102a).

In certain representative embodiments, the WTRU 501 may be a cluster head WTRU, and the second device (e.g., WTRU 102b) may be managed by the cluster head WTRU.

Figure 30:
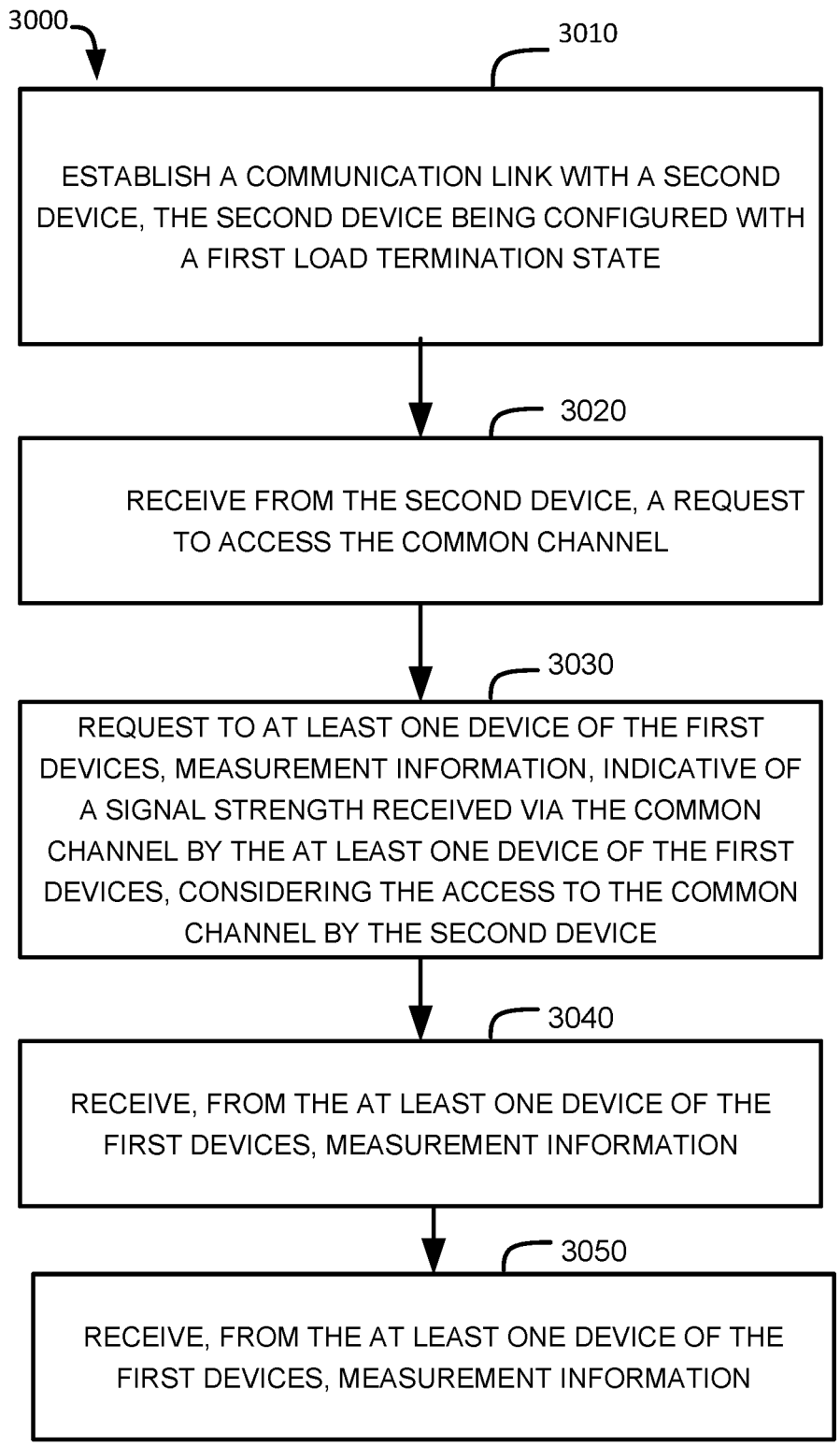
FIG. 30 is a flowchart illustrating a representative method implemented by a WTRU in communication on a common channel via resonance magnetic coupling with one or more first devices.

FIG. 30 is a flowchart illustrating a representative method implemented by a WTRU 501 in communication on a common channel via resonance magnetic coupling with one or more first devices (e.g., WTRUs 102a).

Referring to FIG. 30, the representative method 3000 may include, at block 3010, establishing a communication link with a second device (e.g., WTRU 102b), the second device (e.g., WTRU 102b) being configured with a first load termination state. At block 3020, the WTRU 501 may receive from the second device (e.g., WTRU 102b), a request to access the common channel. At block 3030, the WTRU 501 may request to at least one device of the first devices (e.g., WTRUs 102a), measurement information, indicative of a signal strength received via the common channel by the at least one device of the first devices (e.g., WTRUs 102a), considering the access to the common channel by the second device (e.g., WTRU 102b). At block 3040, the WTRU 501 may receive, from the at least one device of the first devices (e.g., WTRUs 102a), measurement information. At block 3050, the WTRU 501 may authorize the second device (e.g., WTRU 102b) to access the common channel based on the measurement information.

In certain representative embodiments, the common channel may be a broadcast/unicast channel.

In certain representative embodiments, the measurement information includes any of: signal to noise ratio (SNR) and/or reported signal strength (RSS).

In certain representative embodiments, the measurement information includes a signal quality value indicative of a change in the signal strength received via the common channel by the at least one device of the first devices (e.g., WTRUs 102a), considering the access to the common channel by the second device (e.g., WTRU 102b).

In certain representative embodiments, the WTRU 501 may authorize the second device (e.g., WTRU 102b) to access the common channel, on condition that the signal quality value may be lower than a threshold, the threshold being indicative of a maximum allowable reduction of quality level of the common channel.

In certain representative embodiments, the WTRU 501 may determine a second load termination state for the second device (e.g., WTRU 102b) based on the measurement information; and/or may send to the second device (e.g., WTRU 102b), information indicating the determined second load termination state for the second device (e.g., WTRU 102b), and/or wherein the first load termination state may be determined per time slot assignments of the common channel for use by the second device (e.g., WTRU 102b), and/or wherein the second load termination state may be determined per time slot assignments of the common channel for use by at least one device of the first devices (e.g., WTRUs 102a).

In certain representative embodiments, the WTRU 501 may determine a second load termination state for the at least one device of the first devices (e.g., WTRUs 102a) based on the measurement information; and/or send to the at least one device of the first devices (e.g., WTRUs 102), information indicating the determined second load termination state for the at least one device of the first devices (e.g., WTRUs 102a). In certain representative embodiments, the first load termination state may be determined per time slot assignments of the common channel for use by the second device (e.g., WTRU 102b), and/or the second load termination state may be determined per time slot assignments of the common channel for use by at least one device of the first devices (e.g., WTRUs 102a).

In certain representative embodiments, on condition that the signal quality value may be greater than a first threshold and lower than a second threshold, the first threshold being indicative of a first maximum allowable reduction of quality level of the common channel and/or the second threshold being indicative of a second higher reduction of quality level of the common channel, the WTRU 501 may determine a second load termination state for the second device (e.g., WTRU 102b) based on the measurement information; and/or may send to the second device (e.g., WTRU 102b), information indicating the determined second load termination state for the second device (e.g., WTRU 102b).

In certain representative embodiments, the second load termination state may be determined per time slot assignments of the common channel for use by the second device (e.g., WTRU 102b), and/or wherein the second load termination state may be used as a default load termination for access to the common channel by the second device (e.g., WTRU 102b).

In certain representative embodiments, the WTRU 501 may determine a third load termination state for the at least one device of the first devices (e.g., WTRUs 102a) based on the measurement information; and/or may send to the at least one device of the first devices (e.g., WTRUs 102a), information indicating the determined third load termination state for the at least one device of the first devices (e.g., WTRUs 102a). In certain representative embodiments, the second load termination state may be determined per time slot assignments of the common channel for use by the second device (e.g., WTRU 102b), and/or the third load termination state may be determined per time slot assignments of the common channel for use by at least one device of the first devices (e.g., WTRUs 102a).

Figure 31:
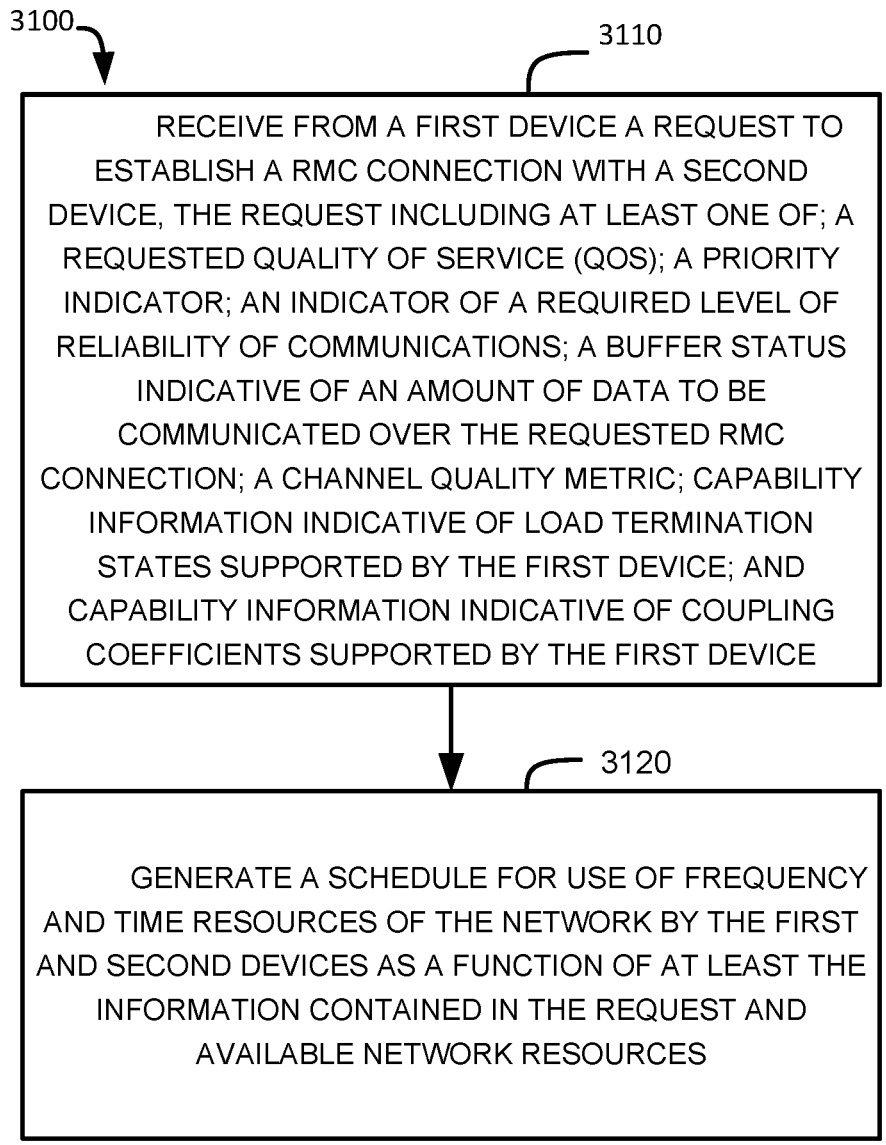
FIG. 31 is a flowchart illustrating a representative method implemented by a cluster head for controlling device access in a resonance magnetic coupled (RMC) network.

FIG. 31 is a flowchart illustrating a representative method implemented by a cluster head (e.g., WTRU 501) for controlling device access in a resonance magnetic coupled (RMC) network.

Referring to FIG. 31, the representative method 3100 may include, at block 3110, receiving from a first device (e.g., WTRU 102a) a request to establish a RMC connection with a second device (e.g., WTRU 102b), the request including at least one of; a requested Quality of Service (QoS); a priority indicator; an indicator of a required level of reliability of communications; a buffer status indicative of an amount of data to be communicated over the requested RMC connection; a channel quality metric; capability information indicative of load termination states supported by the first device (e.g., WTRU 102a); and/or capability information indicative of coupling coefficients supported by the first device (e.g., WTRU 102a). At block 3120, the cluster head (e.g., WTRU 501) may generate a schedule for use of frequency and/or time resources of the network by the first and/or second devices (e.g., WTRUs 102b) as a function of at least the information contained in the request and/or available network resources.

In certain representative embodiments, the second device (e.g., WTRU 102b) may be one of another device managed by the cluster head (e.g., WTRU 501) or the cluster head (e.g., WTRU 501) itself.

In certain representative embodiments, the schedule may comprise at least time slot assignments for use by the first and/or second devices (e.g., WTRUs 102b) and/or load termination states.

In certain representative embodiments, the schedule may be a schedule for use of a broadcast channel (BCH).

In certain representative embodiments, the schedule may comprise a frequency assignment.

In certain representative embodiments, if the first device (e.g., WTRU 102a) has a receive signal strength greater than a minimum threshold and greater than a second, higher threshold, the cluster head (e.g., WTRU 501) may assign a load state such that the signal power delivered to the device may be reduced to a level below the second threshold and above the first threshold.

Figure 32:
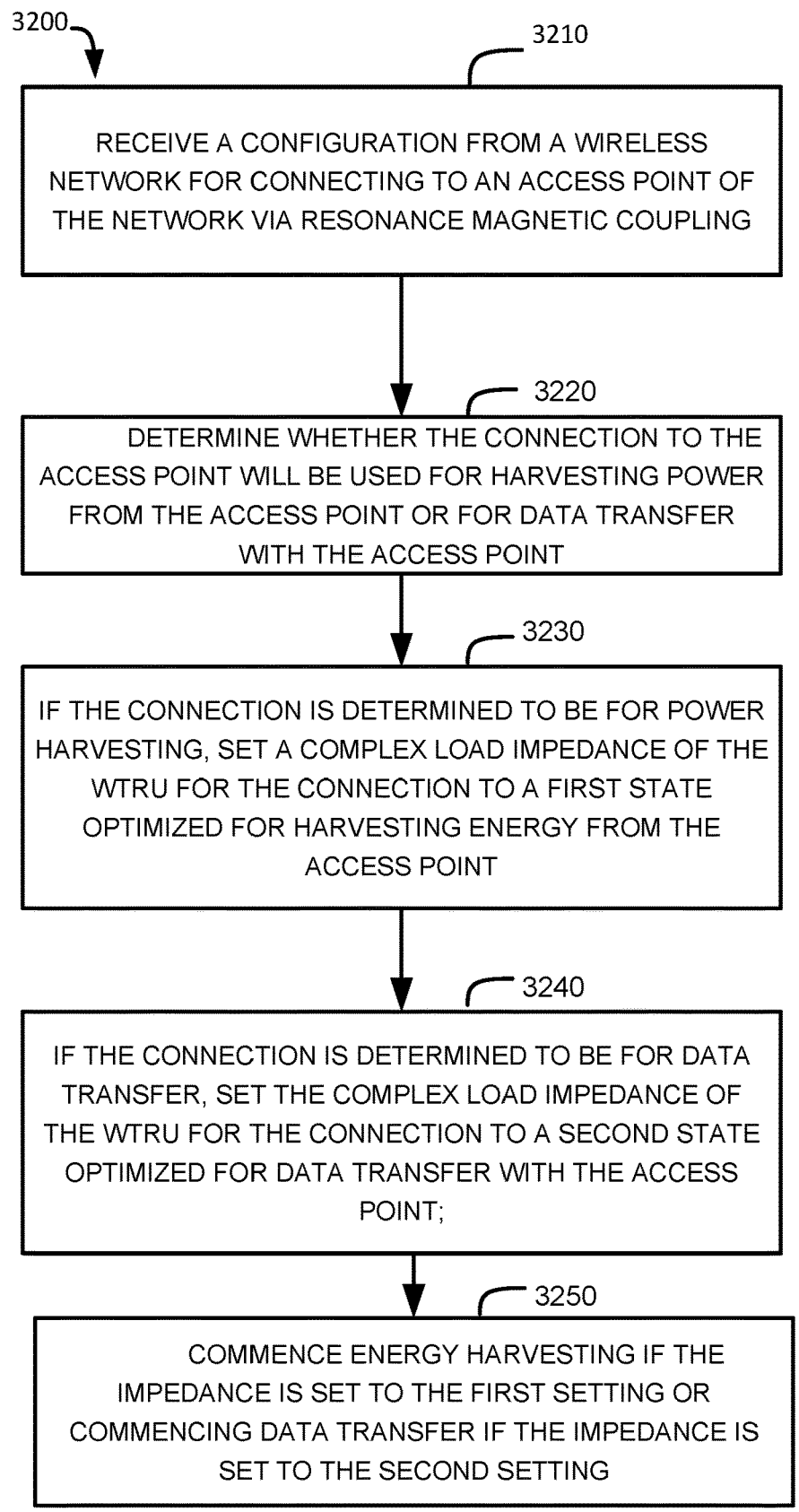
FIG. 32 is a flowchart illustrating a further representative method implemented by a WTRU.

FIG. 32 is a flowchart illustrating a representative method implemented by a WTRU.

Referring to FIG. 32, the representative method 3200 may include, at block 3210, receiving a configuration from a wireless network for connecting to an access point of the network via resonance magnetic coupling. At block 3220, the WTRU 501 may determine whether the connection to the access point will be used for harvesting power from the access point or for data transfer with the access point. At block 3230, if the connection is determined to be for power harvesting, the WTRU 501 may set a complex load impedance of the WTRU for the connection to a first state optimized for harvesting energy from the access point. At block 3240, if the connection is determined to be for data transfer, the WTRU 501 may set the complex load impedance of the WTRU for the connection to a second state optimized for data transfer with the access point. At block 3250, the WTRU 501 may commence energy harvesting if the impedance is set to the first setting or commencing data transfer if the impedance is set to the second setting.

In certain representative embodiments, the WTRU 501 may receive the complex load impedance setting from the network.

In certain representative embodiments, the complex load impedance comprises a real part and/or a reactive part.

In certain representative embodiments, the first load impedance state and/or the second load impedance state are orthogonal to each other.

In certain representative embodiments, for power harvesting, the WTRU 501 may couple to a CW tone at a first frequency; and/or for data transfer, the WTRU 501 may couple to a data channel at a second frequency.

Figure 33:
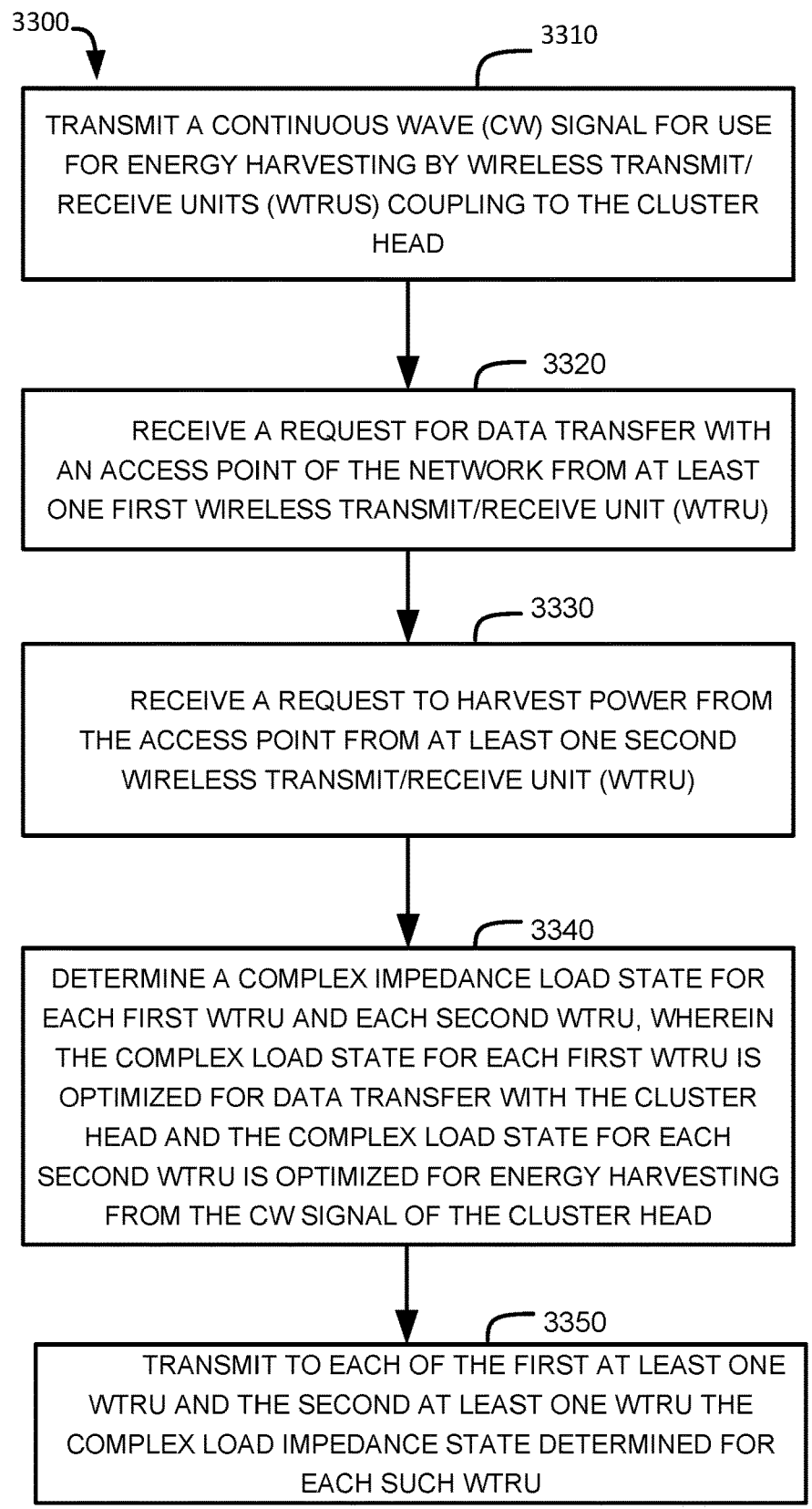
FIG. 33 is a flowchart illustrating a representative method implemented in a cluster head of a resonance magnetic coupling network.

FIG. 33 is a flowchart illustrating a representative method implemented in a cluster head 501 of a resonance magnetic coupling network.

Referring to FIG. 33, the representative method 3300 may include, at block 3310, transmitting a CW signal for use for energy harvesting by WTRUs 102 coupling to the cluster head (e.g., WTRU 501). At block 3320, the cluster head 501 may receive a request for data transfer with an access point of the network from at least one first WTRU 102a. At block 3330, the cluster head 501 may receive a request to harvest power from the access point from at least one second WTRU 102b. At block 3340, the cluster head 501 may determine a complex impedance load state for each first WTRU 102a and each second WTRU 102b, wherein the complex load state for each first WTRU 102a may be optimized for data transfer with the cluster head 501 and/or the complex load state for each second WTRU 102b may be optimized for energy harvesting from the CW signal of the cluster head 501. At block 3350, the cluster head 501 may transmit to each of the first at least one WTRU 102a and/or the second at least one WTRU 102b the complex load impedance state determined for each such WTRU.

In certain representative embodiments, the cluster head 501 may determine a power budget for supporting data transfer with the first at least one WTRU 102a and/or energy transfer with the at least one second WTRU 102b.

In certain representative embodiments, the determination of load impedance states for the WTRUs may be based on at least one of signal to noise ratio (SNR) and/or reported signal strength (RSS) of the first and/or second WTRUs.

In certain representative embodiments, the load impedance states for the first WTRU 102a and/or the second WTRU 102b are orthogonal to each other.

In certain representative embodiments, the CW tone may have a frequency that is different than a frequency of any data transfer channel of the cluster head 501.

In certain representative embodiments, the CW tone may have a substantially greater amplitude than is used for the data transfer channels.

In certain representative embodiments, the frequency of the CW tone may be dynamically selected as a function of data communications occurring on data transfer channels.

In certain representative embodiments, the cluster head 501 may instruct the first at least one WTRU to use a data transfer channel having a frequency selected in order to minimize interference between the CW and/or the selected data channel.

In certain representative embodiments, the frequency of the CW tone may be located in the frequency range of Broadcast Channel (BCH) of the cluster head 501 and/or the CW may be modulated with a data signal.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among a plurality of (e.g., multiple) interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

Although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. In addition, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

REFERENCES

The following references may have been referred to hereinabove and are incorporated in full herein by reference.
[1] R. Mongia, Rf and Microwave Coupled-Line Circuits. City: Artech House Publishers, 2007.
[2] J. Chen, Feedback Networks: theory and circuit application. City: World Scientific Publishing Company, 2007.

The invention claimed is:

1. A method implemented by a Wireless Transmit/Receive Unit (WTRU), the method comprising:
receiving from a first device configured to send a transmission via resonance magnetic coupling, measurement information resulting from measurements performed by the first device;
determining a load termination state for the first device based on the measurement information; and
sending to the first device, information indicating the determined load termination state for the first device.

2. The method according to claim 1, wherein the load termination state is determined per time slot and/or frequency assignments for use by the first device.

3. The method according to claim 1, comprising sending to the first device, information indicating time slot and/or frequency assignments for use by the first device.

4. The method according to claim 1, comprising sending to the first device, information indicating an operation mode corresponding to any of a transmit mode, a receive mode, or facilitate mode and/or corresponding load termination state.

5. The method according to claim 1, comprising: receiving from the first device, a request to send a transmission to a second device via resonance magnetic coupling, the request including capability information indicating a set of load termination states supported by the first device, and wherein the load termination state is determined among the set of load termination states indicated by the capability information.

6. The method according to claim 1, wherein the measurement information includes information indicating any of: signal to noise ratio and/or reported signal strength.

7. The method according to claim 1, wherein the received request includes information indicating any of: a requested quality of service, a priority indicator, an indicator of a required level of reliability of communications, a buffer status indicative of an amount of data to be communicated via the requested transmission, a channel quality metric, and capability information indicative of coupling coefficients supported by the first device; and
wherein determining a load termination state for the first device is based on at least the information included in the received request.

8. The method according to claim 1, wherein the WTRU is a cluster head WTRU, and the second device is managed by the cluster head WTRU.

9. The method according to claim 1 further comprising:
determining a load termination state for the second device based on the measurement information; and
sending to the second device, information indicating the determined load termination state for the second device.

10. The method according to claim 1, comprising:
sending to the first device, measurement configuration information, the measurement configuration information including information indicating (1) timing and/or frequency information to schedule the measurement of a signal strength received by the first device; and (2) at least one load termination state of a set of load termination states to be used by the first device when performing measurements, and wherein the measurement information result from measurements performed by the first device in accordance with the sent measurement configuration information.

11. A Wireless Transmit/Receive Unit (WTRU), the WTRU comprising:
a transmitter/receiver unit configured to:
receive from a first device configured to send a transmission via resonance magnetic coupling, measurement information resulting from measurements performed by the first device;
a processor configured to determine a load termination state for the first device based on the measurement information; and
wherein the transmitter/receiver unit is configured to send to the first device, information indicating the determined load termination state for the first device.

12. The WTRU according to claim 11, wherein the load termination state is determined per time slot and/or frequency assignments for use by the first device.

13. The WTRU according to claim 11, configured to send the first device, information indicating time slot and/or frequency assignments for use by the first device.

14. The WTRU according to claim 11, configured to send the first device, information indicating an operation mode corresponding to any of a transmit mode, a receive mode, or facilitate mode and/or corresponding load termination state.

15. The WTRU according to claim 11, configured to receive from the first device, a request to send a transmission to a second device via resonance magnetic coupling, the request including capability information indicating a set of load termination states supported by the first device, and wherein the load termination state is determined among the set of load termination states indicated by the capability information.

16. The WTRU according to claim 11, wherein the measurement information includes information indicating any of: signal to noise ratio and/or reported signal strength.

17. The WTRU according to claim 11, wherein the received request includes information indicating any of: a requested quality of service, a priority indicator, an indicator of a required level of reliability of communications, a buffer status indicative of an amount of data to be communicated via the requested transmission, a channel quality metric, and capability information indicative of coupling coefficients supported by the first device; and
wherein determining a load termination state for the first device is based on at least the information included in the received request.

18. The WTRU according to claim 11, wherein the WTRU is a cluster head WTRU, and the second device is managed by the cluster head WTRU.

19. The WTRU according to claim 11, configured to determine a load termination state for the second device based on the measurement information; and
   configured to send to the second device, information indicating the determined load termination state for the second device.

20. The WTRU according to claim 11, configured to:
   send to the first device, measurement configuration information, the measurement configuration information including information indicating (1) timing and/or frequency information to schedule the measurement of a signal strength received by the first device; and (2) at least one load termination state of a set of load termination states to be used by the first device when performing measurements, and wherein the measurement information result from measurements performed by the first device in accordance with the sent measurement configuration information.

\* \* \* \* \*